United States Patent [19]

White

[11] 4,348,740

[45] Sep. 7, 1982

[54] METHOD AND PORTABLE APPARATUS FOR COMPARISON OF STORED SETS OF DATA

[76] Inventor: Edward A. White, 5780 Echo Canyon Cir., Phoenix, Ariz. 85018

[21] Appl. No.: 159,206

[22] Filed: Jun. 13, 1980

Related U.S. Application Data

[63] Continuation-in-part of Ser. No. 893,342, Apr. 4, 1978, abandoned.

[51] Int. Cl.[3] ........................ G06F 7/02; G06F 15/16; G06F 15/336

[52] U.S. Cl. ................................. 364/900; 340/146.2; 364/410; 364/419; 364/728; 434/237; 273/237

[58] Field of Search ... 364/200 MS File, 900 MS File, 364/410, 413, 415, 418, 419, 704, 706, 709, 715, 728; 340/146.3 Q, 146.2; 434/201, 237, 335, 336, 338, 350; 273/237, 238

[56] References Cited

U.S. PATENT DOCUMENTS

| | | | |
|---|---|---|---|
| 3,816,722 | 6/1974 | Sakoe et al. | 364/728 |
| 3,906,460 | 9/1975 | Halpern | 364/900 X |
| 4,051,605 | 10/1977 | Toal et al. | 364/704 |
| 4,079,365 | 3/1978 | Yamauchi | 434/350 X |
| 4,205,464 | 6/1980 | Baggott | 434/336 X |
| 4,277,837 | 7/1981 | Stuckert | 364/900 |

*Primary Examiner*—Gareth D. Shaw
*Assistant Examiner*—Eddie P. Chan
*Attorney, Agent, or Firm*—Cahill, Sutton & Thomas

[57] ABSTRACT

Method and portable processor for storing and comparing sets of personal data relating to personal preferences and personality. First and second portable processing units each include a processor, a memory, an input device, a display device, and a connector. The owner of a portable processor can enter personal data via the input device of the portable processor in response to a questionnaire. The owner of that portable processor may then meet another person having a similar or identical portable processor storing that person's personal data. The two persons can interconnect the two portable processors by means of the connectors. Each portable processor transmits its data to the other and compares its stored data with corresponding data received from the other portable processor. Stored algorithms in each portable processor operate on the compared data to compute a score representing the degree of personal compatibility of the two persons and display the score by means of the respective display devices. In one embodiment of the invention, a first set of data is stored in a low power memory of the first processor and a second set of data is then entered via a keyboard on the first processor into the first portable processor. The program stored in the first processor is further capable of comparing the first set of data with the second set of data and displaying a resulting score without the necessity of connecting a second processor to the first processor.

6 Claims, 22 Drawing Figures

METHOD AND PORTABLE APPARATUS FOR COMPARISON OF STORED SETS OF DATA

CROSS-REFERENCE TO RELATED APPLICATIONS

This application is a continuation-in-part of my earlier application entitled "METHOD AND PORTABLE APPARATUS FOR COMPARISON OF STORED SETS OF DATA", Ser. No. 893,342, filed Apr. 4, 1978 now abandoned.

BACKGROUND OF THE INVENTION

The invention relates to portable processing units, and particularly to interconnectable portable processing units for storing and comparing sets of personal data stored therein and to methods of comparing such data.

A number of tests have been devised by psychologists to obtain personality profiles of individual men and women. Usually, the man or woman answers a large number of questions to provide the personality data upon which such tests and comparisons are based. Such personality data can then be compared for an individual man and woman to provide an indication of their compatibility as potential marriage partners. A large number of books and articles on the general subject of dating, compatibility with members of the opposite sex, personality analysis, and criteria of compatibility for successful marriages are widely available. One book directed to this general subject matter is "Compatibility Test" by Charles M. Whipple, Jr. and Dick Whittle, 1976, Pentice-Hall, Inc. Many individuals, including persons who have never been married or recently divorced persons wishing to meet persons of the opposite sex with whom they are compatible, read such books and publications in an attempt to obtain greater insights into their own personalities and personalities of others. Single persons who become personally involved and begin to seriously contemplate marriage to each other often consult professional counselors or psychologists, who administer various psychological tests, such as the Edwards Personal Preference Test, and advise the clients on the basis of data obtained from such tests. However, this approach is unsatisfactory during the early stages of a relationship between a man and a woman because of the inconvenience and expense involved. Up to now, no suitable method conducive to comprehensive comparison of the personality data between a man and a woman sufficiently early in their relationship that such a comparison might be most helpful, since it is well known that strong attachments may be formed between highly incompatible persons. Such attachments frequently result in unhappy marriages or unhappy endings to such relationships.

Nowadays, single men and women frequently congregate in so-called "singles' organizations, such as Parents Without Partners, or in "singles bars". In such places, and on many other occasions, a single person has the opportunity to meet a large number of persons of the opposite sex who are also interested in meeting persons with whom to date and become acquainted. In many instances, it would be helpful for single persons to have a convenient, inexpensive, and reasonably reliable means of "screening" persons of the opposite sex they meet in order to get a preliminary indication of personality compatibility. It would be highly desirable that such means of "screening" not interfere with the ordinary inter-personal interaction by which single persons customarily get to know each other. In the past, computers have been utilized to store personality data for individuals. Computers have also been utilized to compare sets of data for a pair of individuals to determine their areas of compatibility and/or incompatibility as potential mates. However, the general purpose which computers have been utilized for is obviously unsatisfactory for "on-the-spot" analysis and/or comparison of personality data for a man and a woman at the scene of their first meetings. Computerized dating services which select compatible "dates" for subscribers to the dating services are known. However, such dating service organizations are very expensive, and prevent the individual man or woman from having the freedom of spontaneously selecting dating partners. Further, due to the high cost and loss of privacy of such computerized dating services, the pool of available individuals from which supposedly compatible dating partners may be selected is very small.

In summary, there exists a need for an inexpensive, yet convenient means for on-the-spot comparing of personality profiles of man and woman to aid them in discovering their various areas of basic compatibility with each other.

SUMMARY OF THE INVENTION

Accordingly, it is an object of the invention to provide a low cost system and method for storing and comparing sets of data.

It is another object of the invention to provide a low cost portable system and apparatus especially suitable for storing and comparing sets of personal preference data and/or personality data and computing and displaying a compatibility source.

It is another object of the invention to provide a portable low cost system for storing and comparing sets of personality data, which system if sufficiently small in size to be easily carried in a person's pocket, purse, or worn as an ornament.

It is another object of the invention to provide a portable, inexpensive multi-purpose data comparison system.

It is another object of the invention to provide a low cost first portable processor capable of comparing a set of personal data essentially permanently stored therein with another set of personal data which is either entered directly into the first processor by means of keyboard thereof or from a second processor by means of a coupling between the first and second processors.

Briefly described, and in accordance with one embodiment thereof, the invention provides a portable system and method for comparison of stored sets of data. The system includes two portable processors each having a memory for storing a data set and operating software. The respective owners of each portable processor can enter personal data into the memories of the respective portable processors. The two portable processors can be interconnected by male and female connectors or by optical coupling devices such that the operating program of each causes it to transmit its stored data to the other portable processor and compare its stored data with corresponding data received from the other unit. The software of each portable processor causes that portable processor to compute a score indicative of the degree of matching or compatibility between the two sets of data and display that score by means of a display unit of that portable processor. In one embodiment of the invention, each portable processor includes a microprocessor, a random N channel MOS access memory, a read only memory, and an interface adaptor, each implemented by means of respective N channel MOS integrated circuits, which are utilized in conjunction with a light emitting diode alphanumeric display unit. In another embodiment of the invention, complementary metal oxide semiconductor integrated circuits are utilized to implement the microprocessor, the read only memory, the random access memory and the interface circuitry, and an alphanumeric liquid crystal display unit is utilized to display the compatibility scores computed. In another embodiment of the invention, the portable processor has storage elements for temporarily storing data received from another portable processor. The portable processor is subsequently connected to a central data processing system to input the temporarily stored data to the central data processing system, which utilizes stored algorithms to analyze and compare the received data with the data of the owner of the portable processor being utilized to enter the data into the central data processing system. In yet another embodiment of the invention, the portable processor includes expanded algorithms and storage capability for storing additional sets of data, and is capable of receiving and comparing data received from a separate portable processor with a different operating algorithm. In yet another embodiment of the invention, the portable processor has its operating program and algorithm stored in an electrically alterable read only memory and may be connected to a central data processing system to update the operating software and algorithm by altering the contents of the electrically alterable read only memory. Another embodiment of the invention is incorporated in an electronic timepiece or calculator. In another embodiment of the invention, a first portable processor semipermanently stores a first set of personal data therein and executes a program which effects entry of a second set of personal data into the portable processor either from a second portable processor or directly by means of a keyboard of the first portable processor. The first portable processor then computes and displays a compatability score between the first and second sets of personal data, regardless of how the second set of data is entered into the first portable processor.

DESCRIPTION OF THE INVENTION

Figure 1:
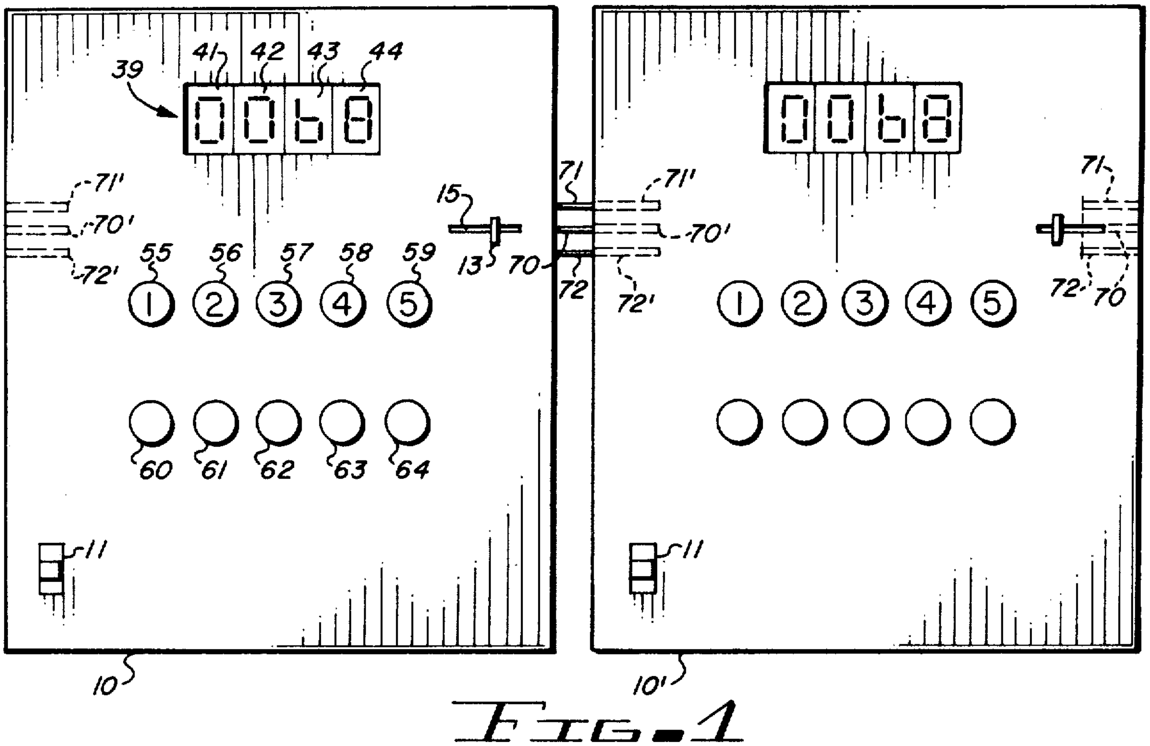
FIG. 1 is a diagram showing two portable processing units coupled together according to the invention.

FIG. 1 shows a portable processor 10 having a display unit 39 including four separate units 41, 42, 43, and 44, each of which is a seven segment alphanumeric light emitting diode display unit. Portable processor unit 10 includes a switch 11, which may be utilized to connect power to the internal microprocessor, as explained subsequently. Portable processor unit 10 also includes five data entry keys 55, 56, 57, 58 and 59. Portable processor unit 10 includes five control keys, labeled 60, 61, 62, 63 and 64.

Portable processor unit 10 includes sockets 70', 71', and 72', which may be utilized to temporarily connect portable processor 10 to an identical or similar portable processor 10'. Portable processor 10 further includes extendable prongs 70, 71, and 72, which may be extended outwardly from the side of portable processor 10 by means of lever 13, which slides to the right in slot 15, so that prongs 70, 71, and 72 are inserted into portable processor unit 10'.

As explained subsequently in greater detail, each of portable processors 10 and 10' of FIG. 1 stores at least one set of personal data which has been previously entered into the respective portable processors by means of the above-mentioned control keys and data keys of the respective portable processors. Each of portable processors 10 and 10' includes a microprocessor and a memory for storing a set of data and an operating program. Each portable processor stores an operating program which permits that unit to compare its own stored data set with the data set from the other portable processor and compute a "score" which indicates the level of personal compatibility between the persons from whom the two data sets were obtained.

Of course, the external shapes of the portable processors may be varied greatly from the shapes shown in FIG. 1. For example, heart-shaped units could be utilized. As subsequently explained with reference to FIGS. 10 and 11, the portable processors of the invention can be incorporated into ordinary pocket calculators or electronic wristwatches. Differently shaped units could be utilized for men's units and women's units. By incorporating all of the digital circuitry on a single integrated chip and utilizing miniature display units and input keys, the portable processors may be made sufficiently small to be easily carried in a pocket or purse, or even worn as an ornament.

Figure 2:
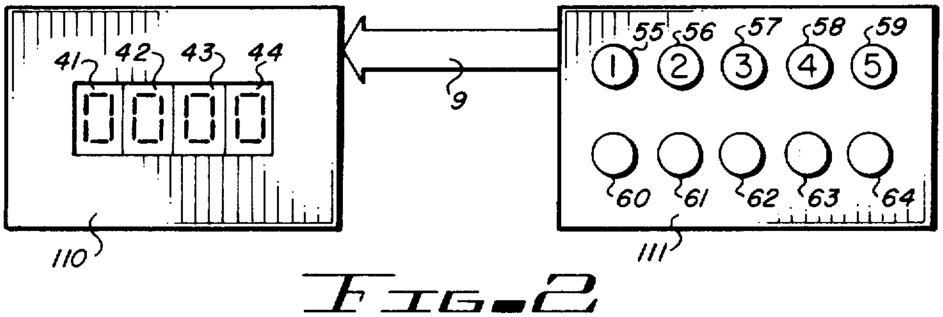
FIG. 2 is a diagram showing a portabe processor having no data input keys, wherein a remote inputting device is utilized to enter a set of data into the portable processor.

If desired, the keys shown in FIG. 1 may be eliminated, to provide a portable processor such as 110 in FIG. 2, and data may be entered therein by means of a remote keyboard input unit 111 as shown in FIG. 2. Remote input unit 111 is coupled by means of an appropriate cable 9 to portable processor unit 110. When two portable processors such as 110 in FIG. 2 are mated, they automatically exchange data and compute a compatibility score, which is then displayed in the display unit 39.

Figures 3A, 4:
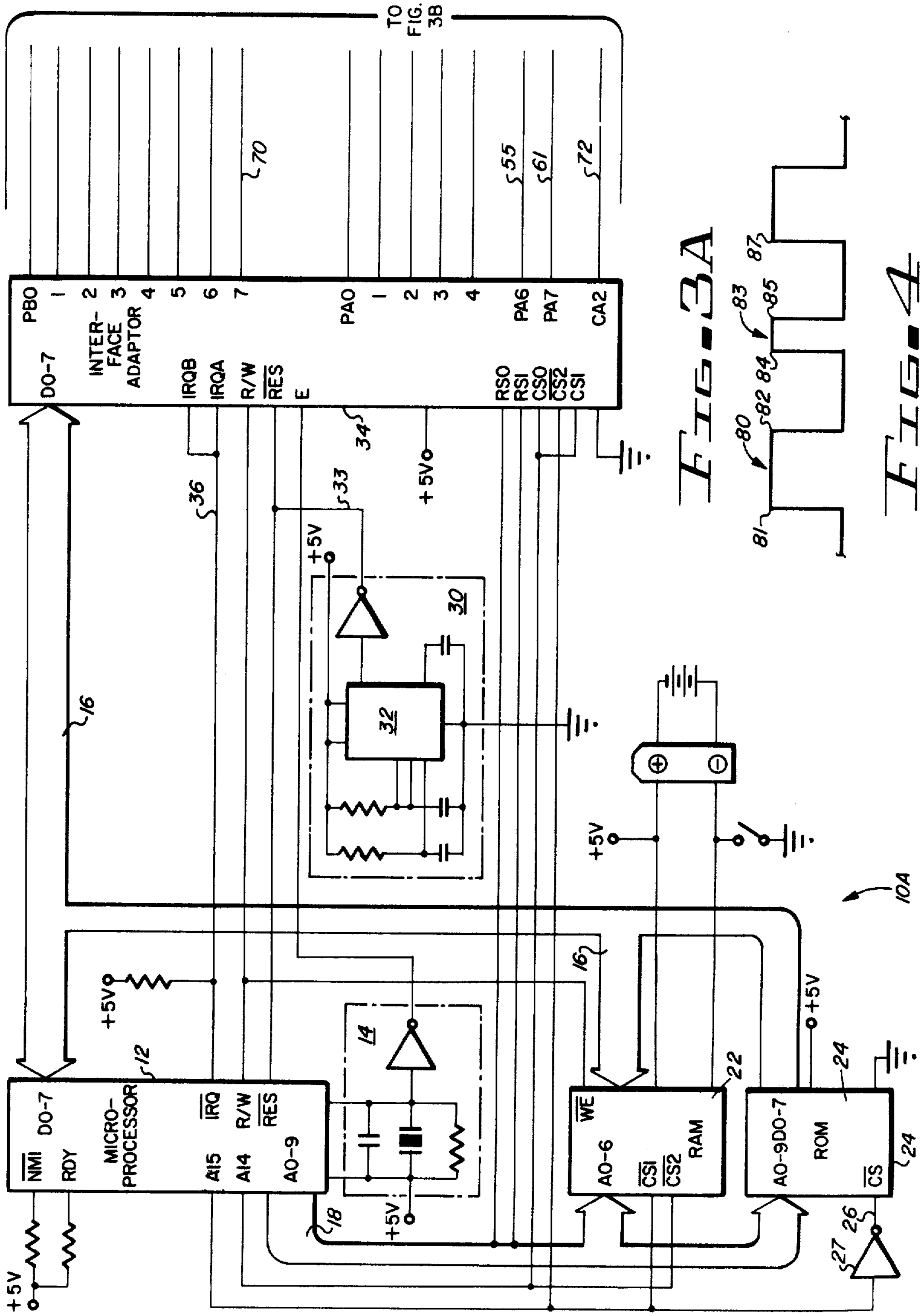
FIGS. 3A and 3B together, constitute a schematic diagram of circuitry of one embodiment of the invention.
FIG. 4 is a waveform showing the format of data serially transmitted by the portable processor circuit of FIGS. 3A and 3B.
Figure 3B:
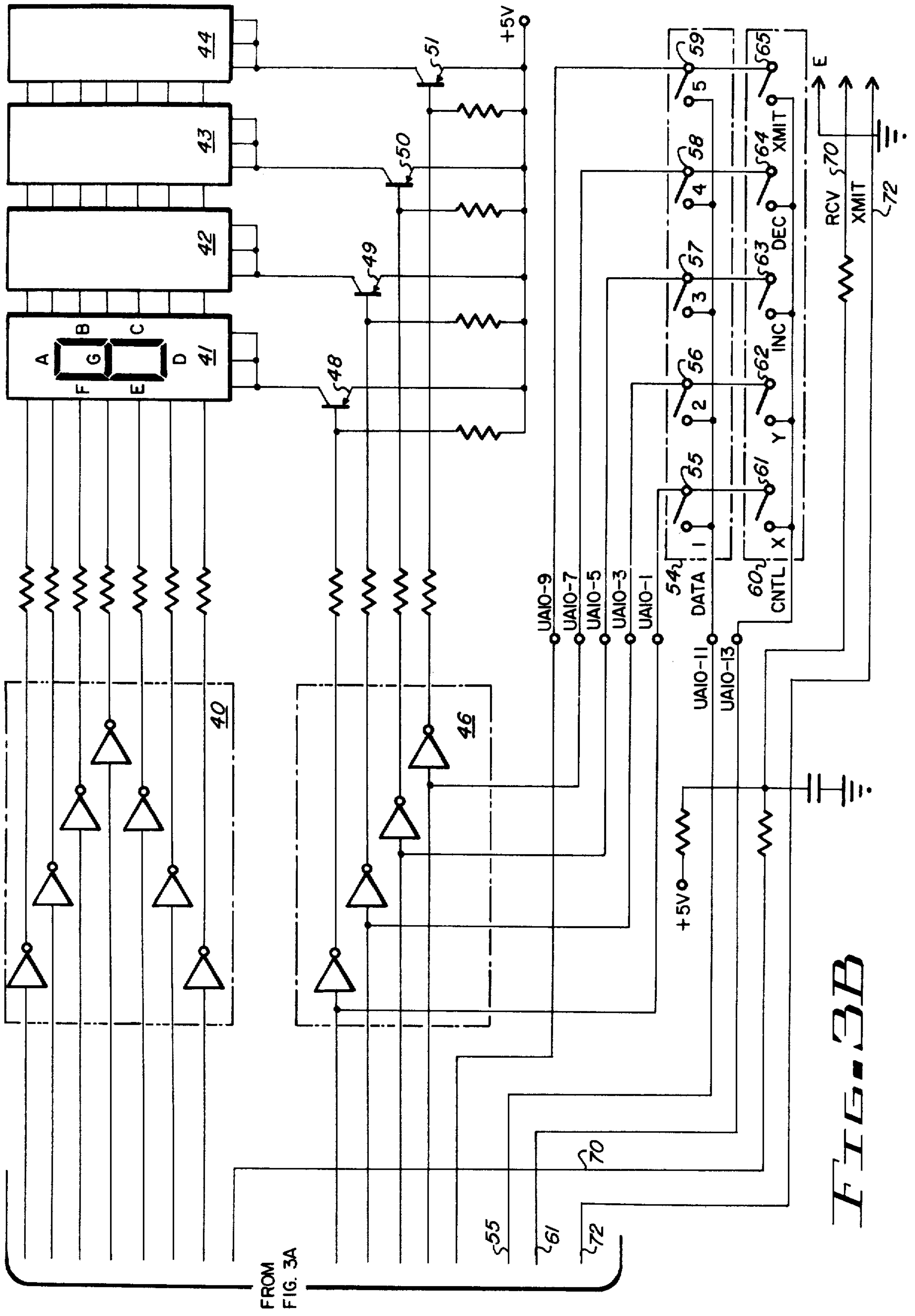

The detailed circuitry 10A for a working model of portable processor unit 10 is shown in FIGS. 3A and 3B.

Referring now to FIGS. 3A and 3B, circuitry 10A of portable processor 10 includes microprocessor 12, which is an eight bit microprocessor. Microprocessor 12 can be implemented by utilizing the MOS Technology Inc. Model 6502 microprocessor; The same model of microprocessor is also manufactured by Synertek Corporation and North American Rockwell Corporation. A crystal oscillator circuit 14 produces the clock signals required for operation of microprocessor 12. Microprocessor 12 has its data terminals D0-D7 coupled to the corresponding conductors of bidirectional data bus 16. The microprocessor address outputs A0-A9, indicated generally by reference numera 18, are connected to the corresponding address inputs A0-A6 of random access memory 22 and to the corresponding address inputs A09 of read only memory 24.

Random access memory 22 can be implemented by utilizing a Motorola MCM 6810 128 word by eight bit static random access memory. Two chip select inputs, $\overline{CS1}$ and $\overline{CS2}$ of random access memory 22 are connected to the A14 and A15 address outputs, respectively, of microprocessor 12. Random access memory 22 has its data input/output terminals connected to bidirectional data bus 16.

Random access memory 22 is utilized to store a plurality of pairs of values of X and Y, hereinafter referred to as X-Y data pairs, wherein X and Y are variables which represent answers given in response to questions from a questionnaire and entered into portable processor 10. The questionnaire includes a plurality of questions which are grouped in pairs, each pair including an "X" question and a "Y" question. The response to each "X" question may be selected as an integer from 1 to 5, the numbers from 1 to 5 designating the "degree" or "weight" of the "X" variable for that question. For each "Y" question, the response selected is also an integer from 1 to 5. In this case, the integers from 1 to 5 indicate the "importance" of the previous "X" variable to the person responding to the questionnaire.

The following six questions and selectable responses constitute three pairs of "X" questions, and corresponding "Y" questions illustrative of the type and manner of data which may be entered into random access memory 22.

1. My education is:
   X
   1 more than a college degree
   2 a college degree
   3 some college
   4 graduated from high school
   5 less than high school diploma
2. My mate's education is:
   Y
   1 not important
   2 somewhat of interest
   3 at my own level
   4 important to be at my level
   5 essential to be at my level
3. I believe that Bible is:
   X
   1 the literal truth
   2 most, but not all of the Bible is literally true
   3 some of the Bible is literally true, but all of it stands for the truth
   4 the Bible is of no significance to me
   5 the Bible is merely writings of historical value
4. My mate's opinion of the Bible is:
   Y
   1 not important
   2 somewhat of importance
   3 desirable to be like mine
   4 important to be like mine
   5 essential to be like mine
5. I prefer to live in:
   X
   1 a rural area
   2 a town far from the city
   3 a town near large city
   4 a small city (50,000 to 150,000)
   5 a large city
6. My mate's preference:
   Y
   1 is of no importance
   2 is somewhat of interest
   3 desirable to be like mine
   4 important to be like mine
   5 essential to be like mine For example, question 1 is an "X" question. The respondent to the questionnaire selects one of the digits (1 to 5) and enters it as a value of X for the first X-Y data pair. He then selects one of the responses (1-5) to question 2, which is the "Y" question of the first pair of questions, and enters the selected digit as the value of Y for the first X-Y data pair. In a similar manner, a large amount of data in the form of X-Y data pairs in response to a plurality of additional pairs of questions may be entered into random access memory 22.

Of course, the size of random access memory 22 can be increased to store data corresponding to any number of questions.

Referring again to FIGS. 3A and 3B, read only memory 24 can be implemented utilizing an Intel Model 2758 erasable programmable read only memory. A wide variety of other commercially available read only memories can also be utilized. Address inputs A0-A9 of programmable read only memory 24 are connected to the corresponding A0-A9 inputs of microprocessor 12 by means of address bus 18. A chip select input is connected to conductor 26, which is also connected to inverter 27. Inverter 27 produces the complement of the A15 address output of microprocessor 12. Data bus terminals D0-D7 of read only memory 124 are connected to bidirectional data bus 16.

Portable processor 10 includes a "power on reset" circuit 30, including a "one-shot" integrated circuit 32, which may be implemented utilizing a National Semiconductor LM555 "one-shot" integrated circuit. The output of "power on reset" circuit 30 is applied to the reset inputs of microprocessor 12 and interface adapter 34.

The "power on reset" input signal produced on conductor 33 enables microprocessor 12 to internally initialize its circuitry, and also clears the appropriate internal registers of interface adaptor 34 to permit proper "start up" operation of portable processor 10.

Interface adaptor 34 is implemented utilizing a MOS Technology Model 6520 programmable peripheral interface adaptor, which is identical to the Motorola MC6820 peripheral interface adaptor. The D0-D7 terminals of interface adaptor 34 are connected to bidirectional data bus 16. The interrupt conductors $\overline{IRQA}$ and $\overline{IRQB}$ are connected to conductor 36, which is connected to the $\overline{IRQ}$ input of microprocessor 12 and to the five volt power supply by means of a resistor, which maintains conductor 36 at a logical "1" so that the interrupt circuitry of microprocessor 12 remains inactive. (Of course, other embodiments of the system disclosed herein could readily be supplied by those skilled in the art to take advantage of the interrupt operation capability of both microprocessor 12 and interface adaptor 34.) The register select inputs and chip select inputs of interface adaptor 34 are connected to the A0-A1 address inputs of microprocessor 12 and to the A14 and A15 address outputs of microprocessor 12, respectively.

Interface adaptor 34 has two eight-bit peripheral data busses, designated PB0-PB7 and PA0-PA7. The PB0-PB6 peripheral data bus outputs of interface adaptor 34 are utilized to drive seven inverters in block 40 of FIG. 3B, which inverters function as display drivers to drive the raw inputs of display units 41, 42, 43, and 44. Display units 41, 42, 43, and 44 may be either light emitting diode alphanumeric display units or liquid crystal alphanumeric display units. Peripheral data bus outputs PA0-PA3 of interface adaptor 34 are utilized to drive four inverters in block 46 to FIG. 3B, the outputs of which inverters are connected to drive the bases of PNB transistors 48, 49, 50 and 51, respectively. The collectors of transistors 48, 49, 50 and 51 are connected to drive the column inputs of alphanumeric display devices 41, 42, 43 and 44 respectively.

The PA0-PA4 terminals of interface adaptor 34 are utilized to sense switch closures of five data switches generally indicated in block 54 of FIG. 3B and five control switches in block 60 of FIG. 3B. Each of data switches 55, 56, 57, 58 and 59 has a first terminal connected to the peripheral data bus terminals PA), PA1, PA2, PA3, and PA4, respectively, when peripheral data bus terminals are intially programmed as inputs to interface adaptor 34 such that the switch closure information is transferred via bidirectional data bus 16 to microprocessor 12 during system operation. Each of control switches 61, 62, 63, 64 and 65 each also has a first terminal connected, respectively, to the corresponding first terminals of the above data switches.

Data switches 55, 56, 57, 58 and 59 correspond to the above-described selectable values of the X variables and Y variables, namely the digits 1-5. Each of the data switches also has a second terminal connected to conductor 55. Conductor 55 is connected to the PA6 peripheral data bus of interface adaptor 34. The PA6 peripheral data bus terminal is programmed as an output having a predetermined logic level thereon during system operation. Each of the above control switches also has a second terminal connected to conductor 61, which is connected to the PA7 peripheral data bus terminal of interface adaptor 34. The PA7 peripheral data bus terminal is also programmed as an output during system operation. The control switches 61, 62, 63, 64 and 65 are designated as the X, Y, increment (INC), decrement (DEC), and transmit (XMIT) switches, respectively, in FIG. 3B.

The X and Y switches 61 and 62 are utilized for the purpose of determining whether the presently selected data value inputted to portable processor 10 is an "X" value or a "Y" value. Increment switch 63 is utilized to increment to the next stored X-Y pair in random acess memory 22 to permit displaying of the corresponding stored values of X and Y for that X-Y data pair. Similarly, decrement switch 64 permits decrementing to the preceding X-Y pair stored in random access memory to permit display of the stored values thereof. Transmit switch 65 is utilized to cause the portable processor to initiate transmission of a reference pulse (as shown by reference numeral 80 in FIG. 4) to portable processor 10', as shown in FIG. 1, thereby initiating transmission of data stored in random access memory 22 of portable processor 10' to compare such received data with corresponding stored data in portable processor 10', as previously mentioned (and subsequently described in greater detail).

As indicated above, with reference to FIG. 1, all communication between computers 10 and 10' occurs over transmit line 72 and receive line 70. Transmit line 72 is connected to the CA2 terminal of interface adaptor 34, which can be programmed as either an input or an output of interface adaptor 34 during the initial start-up operation of the portable processor, so that stored data can be transferred from microprocessor 12 via a predetermined conductor of bidirectional data bus 16 into a corresponding bit of an internal register of interface adaptor 34 and then shifted serially out on transmit bus 72 to second portable processor 10'.

Receive conductor 70 permits portable processor 10 to receive data in serial format from portable processor 10'. Receive line 70 is connected to the PB7 terminal of interface adaptor 34. The PB7 terminal of interface adaptor 34 may be initially programmed as an input by the operating software, so that data received from portable processor 10' is transmitted from interface adaptor 34 to microprocessor 12 via bidirectional data bus 16. The roles of transmit line 72 and receive line 70 may be reversed by the operating software, depending upon which of portable processors 10 and 10' has its transmit switch 65 closed first.

In order to avoid the necessity of expensive precision timing circuitry for detecting whether signals transmitted on lines 70 and 72 are logical "ones" or "zeros", the operating software stored in read only memory 24 is programmed to permit each portable processor to transmit an inital signal to the other unit in response to activating of transmit switch 65, so that the receiving portable processor can measure the width of a reference pulse 80, as shown in FIG. 4. The waveform shown in FIG. 4 illustrates initial reference pulse 80, which has a width equal to the time duration between edge 82 and edge 84 of the subsequent pulse 83 which, for purposes of illustration, is chosen to have a width between points 84 and 85 equal to one third of the time elapsed between points 84 and 87. The elapsed time between points 84 and 87 is equal to the elapsed time between points 81 and 84. A pulse having a width equal to the width of pulse 83 followed by a "low" level equal to the time between points 85 and 87 is interpreted by the receiving unit to be a logical "zero" on the basis of the initially measured width of reference pulse 80; a wider is interposed as a logical "one". Thus, relatively imprecise timing generators such as 14 may be utilized for portable processors 10 and 10' without harming the reliability of detecting of logic levels of data serially transmitted between the two portable processors.

An algorithm which performs the interpretation of the received logic levels is stored in read only memory. This algorithm awaits leading edge 81 of the reference pulse 80 received by the receiving portable processor and counts the number of machine cycles which occur until the arrival of edge 82. The receiving portable processor stores this count as a reference. The duration of each succeeding pulse received by the receiving portable processor is then compared to the stored reference, and if such duration is less than the duration of the reference, that succeeding pulse is interpreted as a logical "zero", and if its duration exceeds the duration of the reference pulse, it is interpreted as a logical "one".

A flow chart of the operating program stored in read only memory 24 is shown in FIGS. 6A–E. Referring now to FIGS. 6A–E after turning the power on and system initialization (indicated in block 120), the stored program operates to continually produce signals required to dispaly the appropriate alphanumeric characters on display elements 41–44 of FIGS. 1, 2, and 3B. The four alphanumeric characters represent the values of selected X–Y data pairs stored in random access memory 22 or "scores" resulting from comparison of data stored in one of the portable processors and compared with corresponding data received from another portable processor. It will be recalled that there are a predetermined number of X–Y data pairs stored in random access memory 22. Each time the stored program displays one of the four digits, as indicated in block 124 of FIG. 6A, the program enters decision block 126 to determine whether a "receive and full" condition is met. If the "receive and full" condition has not been met, the program enters decision block 128 to check the keyboard to determine if any of the data keys 55–59 or control keys 61–65 have been depressed. If none of the keys has been depressed, the program reenters display routine 124 to cause the next digit to be displayed. Thus, the four alphanumeric display units are operated at approximately a twenty-five percent duty cycle at a sufficiently fast rate that the human eye will perceive all four display digits as being continuously displayed.

If the program detects that a key has been depressed, the program exits from the display routine. When a signal is received indicating that the depressed key has been released, the program reenters display subroutine 124. If the key has not been released, decision block 132 is entered to determine which key is depressed. If a data input key has been depressed, the program then determines whether the switch closure represents an "X" data input or an "Y" data input. if the switch closure represents a "X" data input, that value of X is stored and a "flag" is set to establish that the next data number received will be a "Y" data value. The program then selects an appropriate subroutine represented by block 122 to display the value of the inputted "X" data number.

Figure 6A:
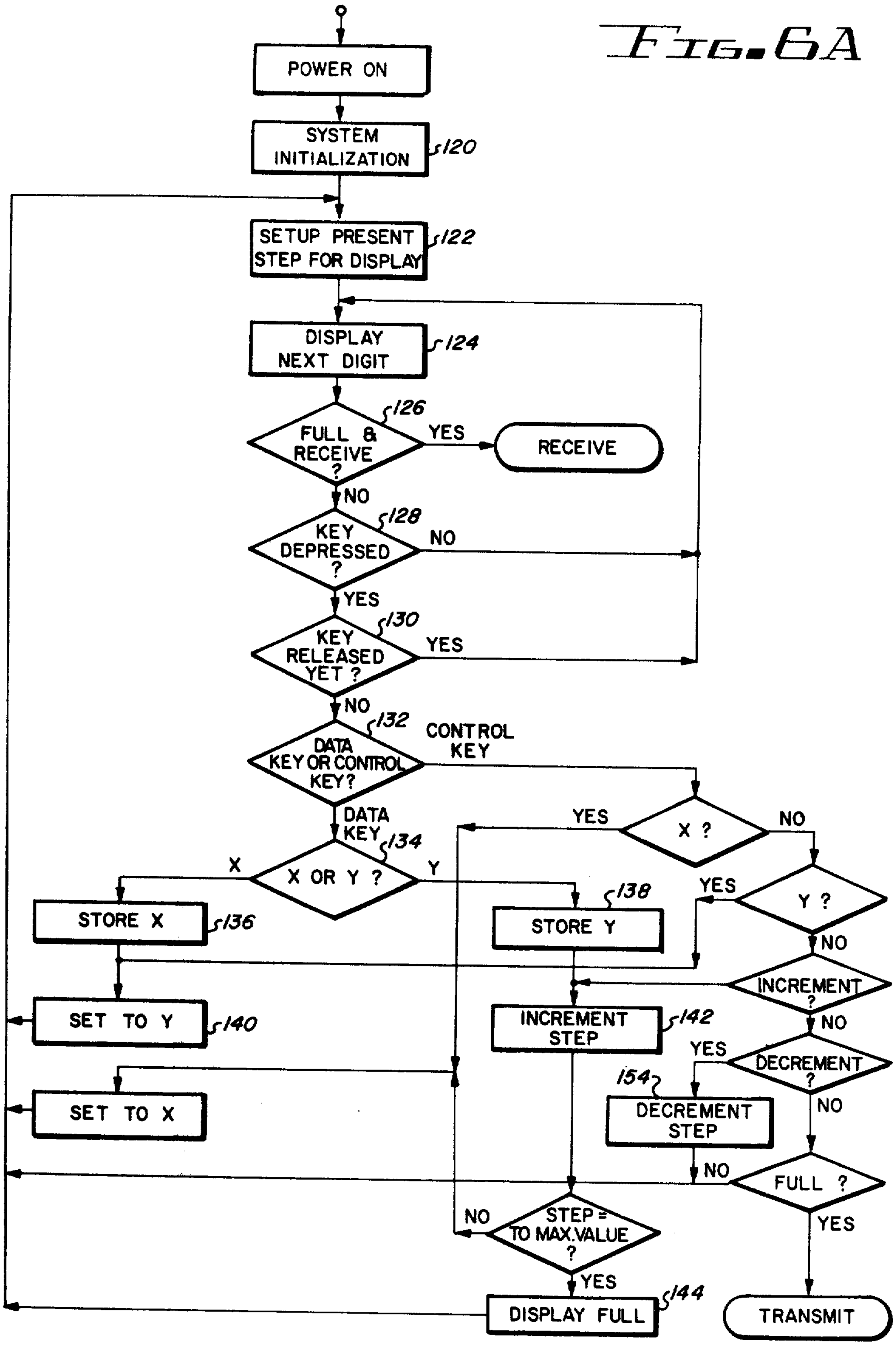
FIGS. 6A through 6E constitute a flow chart of the stored program which controls operation of the portable processor implemented by the circuitry of FIGS. 3A through 3E.

If it is determined in decision block 134 that the inputted number is a "Y" value, that value is stored as indicated in block 138 of FIG. 6A and the "number" of the X–Y pair is incremented and a "flag" is set to establish that the next data number inputted will be an "X" value. If the X–Y pair number being inputted is equal to the maximum X–Y pair number permitted to be stored in random access memory 22, the program causes display routine 124 to display the word FULL in the alphanumeric display elements after that X–Y pair is inputted. Decision block 126 then performs the function of causing the program to enter the RECEIVE subroutine shown in FIG. 6D.

Decision block 130 causes the program to jump back into display routine 124 if the depressed key has not yet been released, but the information corresponding thereto has already been processed. In the event that the information corresponding to the still-depressed key has not yet been processed, the program determines whether that key was a data input key or a control key in decision block 132.

If the program determines in block 132 that the depressed key is a data key and then determines (in decision block 134) that the inputted data number is an X value, the data number is stored in the appropriate part of random access memory 22, as indicated by block 136 of FIG. 6A and sets the above-mentioned flag to indicate that the next data key closure represents a "Y" value, as indicated in block 140 of FIG. 6A. The program then reenters the display mode and further executes the instructions represented by blocks 122, 124, 126 and 128 of FIG. 6A.

If the data number is a "Y" value, that value is stored in the appropriate location of random access memory 22. Also, the current X–Y pair number is incremented, as indicated by block 142, since the X number and Y number of an X–Y data pair are always entered sequentially. The program then again enters the display mode and waits for additional key closures. Each time the X–Y pair number is incremented, the program also checks to determine whether the maximum permitted X–Y pair number has been reached. If this condition is present, the program causes the display unit to display the word FULL, as indicated by block 144. Once the maximum X–Y pair number has been attained, all of the data to be compared has been entered into the portable processor. A flag bit is then set to permit the portable processor to receive data from another portable processor coupled thereto, as shown in FIG. 1. In block 126, if the X–Y data pairs have all been inputted and the FULL condition has been attained, the program checks to determine if any data has been received on the receive line every time a keyboard check operation is performed.

If both interconnected portable processors 10 and 10' are in the "FULL" condition, either portable processor can receive an incoming digit transmitted by the other portable processor, or the users can push a transmit button (such as transmit control switch 65 in FIG. 1) on one of the two portable processors, thereby initiating transmission of X and Y data pairs between the two portable processors. Comparison of the two stored data sets in the respective portable processors then proceeds.

For a portable processor operating in the "receive" mode, the received reference pulse 80 (FIG. 4) is followed by four bits which are interpreted as logical "ones" or "zeros" by comparing their width to the width of reference pulse 80. The four bits represent a binary coded decimal digit. By convention, the first digit received is the first X value received from the sending portable processor, referred to as the first portable processor in the following discussion. The receiving portable processor, referred to as the second portable processor in the following discussion, compares the received X value with the corresponding value of X stored in its own memory and stores the difference, as subsequently explained. Next, the second portable processor sends its first X value to the first portable processor, which also compares its own stored value of X with the value of X received from the second portable processor. The second portable processor then awaits reception of the next digit, which, by convention is a Y digit of the first X-Y pair transmitted by the first portable processor. The second portable processor then processes that value of Y to determine and store the larger of the two Y values of the two first corresponding X-Y data pairs, as subsequently explained. The second portable processor then sends the Y value of its first stored X-Y pair to the first portable processor, which also processes that Y value in the same manner. At this point, both the first and second portable processors each store the "partial results" resulting from the above-described computations.

Figure 6B:
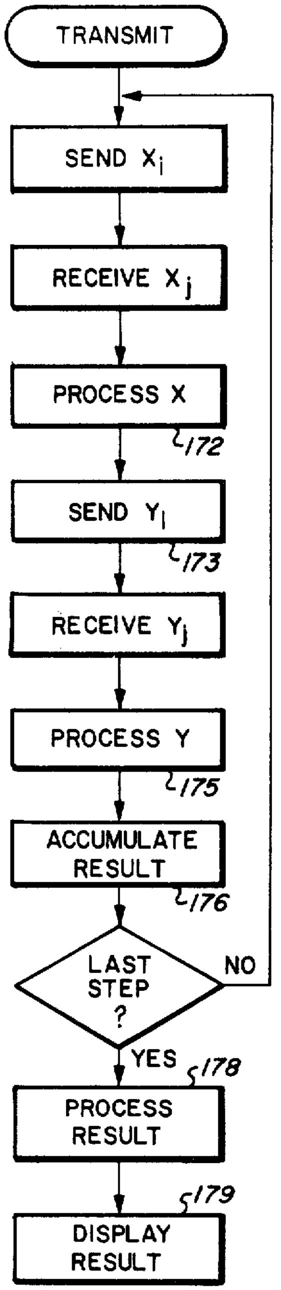

After the above-described procedure has been completed for all X-Y data pairs stored in both first and second portable processors, the cumulative stored results are processed as indicated in block 179 of FIG. 6B, for the first portable processor. Blocks 168 and 169 of FIG. 6D apply to the second portable processor.

Figure 6C:
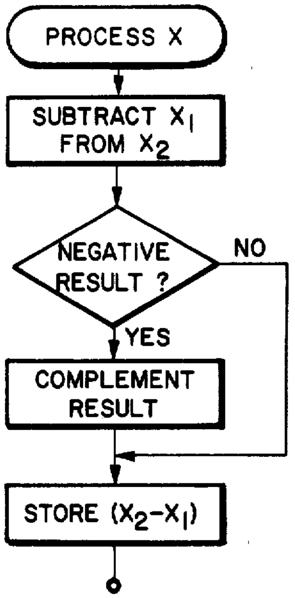
Figure 6D:
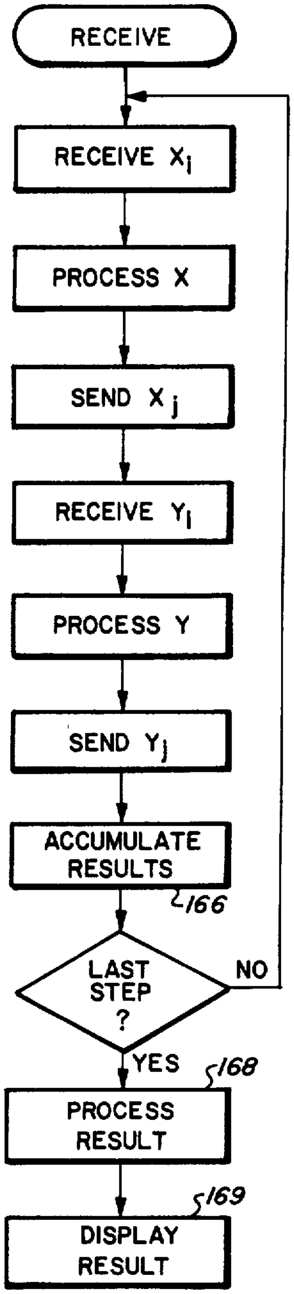

Once both portable processors are in the "display result" modes corresponding to block 169 of FIG. 6D and 179 of FIG. 6B, both portable processors are ready for new X and Y data to be entered or to perform another data comparison with other portable processors.

It should be noted that for the program disclosed herein, the method of operation contemplates sequential entry of the entire stored set of data if the portable processor is in the data entry mode, or comparison of two complete sets of data for two interconnected portable processors if both are in the data comparison mode of operation. However, the operating software could be readily modified, at some additional expense and with requirement of additional random access memory and read only memory storage space, to permit addressing of selected X-Y data pairs and modifying only those X-Y data pairs.

Figure 6E:
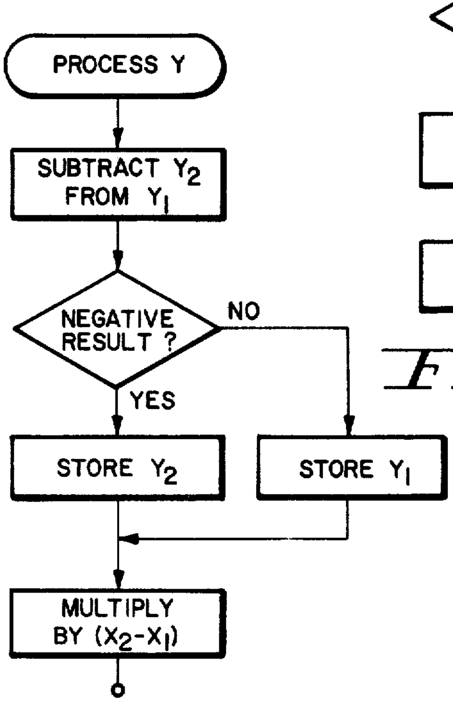

The PROCESS X subroutine shown in Block 172 of FIG. 6B is shown in further detail in FIG. 6C, and includes the steps of obtaining the difference between the stored and received values of X for the current X-Y data pair, determining whether the difference is negative complementing the result if the difference is negative, and reentering the TRANSMIT subroutine of FIG. 6B and entering the SEND Y block 173 of FIG. 6B. The PROCESS Y subroutine 175 is shown in FIG. 6E, and involves, determining and storing the largest of the corresponding Y values of the first and second portable processors and multiplying that larger value by the previously saved magnitude of the difference between the corresponding X values for the same X-Y data pair. The TRANSMIT and RECEIVE subroutines each accumulate running totals of the partially processed results, as indicated by block 166 of FIG. 6D and block 176 of FIG. 6B. Blocks 168 of FIG. 6D and 178 of FIG. 6B may incorporate any suitable subroutines or algorithms for interpreting, scaling, or otherwise processing the cumulative results in order to compute a "score" representative of the desired comparison between the stored data sets of the first and second portable processors.

The quantity which results when the magnitude of the difference between the corresponding X values which are compared as above is referred to herein as a "difference term". A difference term establishes the differences between the belief or preferences of the two individuals whose data sets are being compared with respect to the subject matter of the particular X-Y data pair. The value of Y which is obtained by selecting the larger of the compared Y terms as described above is referred to herein as the "amplifier term". An amplifier term represents the level of importance of the particular subject matter in the eyes of the one of the two persons who are comparing their data who believes it to be the most important. Thus, little weight will be accorded to subject matter which neither party believes is very important to compatibility with a person of the opposite sex.

Figure 5:
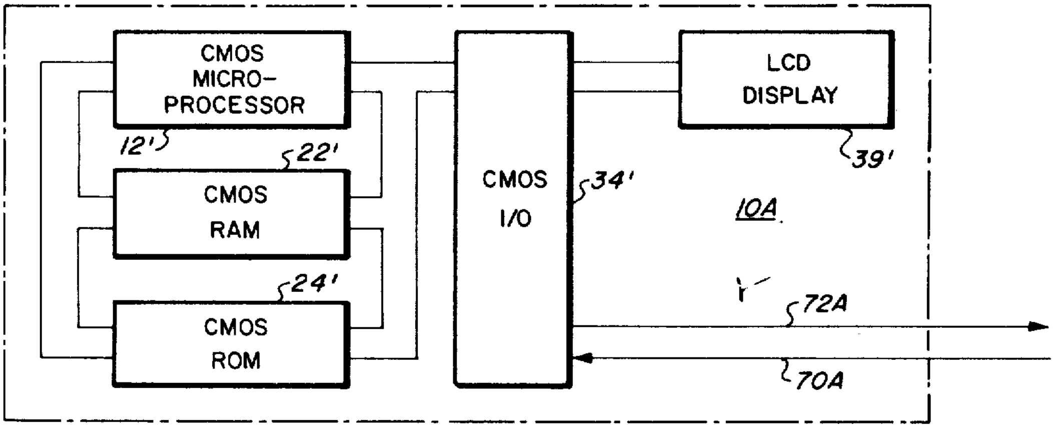
FIG. 5 is a block diagram showing a complementary metal oxide semiconductor embodiment of the portable processor of the invention.

Low power consumption is an important consideration in implementing the portable processor of the invention. It is important that the power level be low so that small batteries can be utilized to power the random access memory 22 without danger of loss of stored data in a short period of time because of battery failure. A block diagram of a low power CMOS (complementary metal oxide semiconductor) integrated circuit implementation of the circuitry 10A of the portable processor unit is shown in FIG. 5, wherein CMOS circuitry is utilized to impelent microprocessor 12', random access memory 22', read only memory 24' and input/output circuitry 34' to which receive conductor 70A and transmit conductor 72A are connected. All of these circuit elements, in combination, can be powered utilizing several 1.5 disc-shaped batteries of the type commonly utilized to power electronic wristwatches. The liquid crystal display unit 39' is utilized in this embodiment of the invention to further reduce the power drain on the batteries over the power drain which would result from use of light emitting diode display units. Because of the very low power dissipation of CMOS circuitry, the stored data set may be maintained in random access memory 22 for a length of time approaching the shelf life of the batteries for the embodiment of the invention of FIG. 5. To further reduce the power drain on the batteries, switch 11, as shown in FIG. 1, can be utilized to turn off power to all elements of the portable processor except random access memory 22 when the portable processor is not being utilized.

It should be recognized that other types of personal data than data relating to compatibility of individuals as potential marriage partners can be compared, according to the present invention. For example, data concerning an individual's professional abilities and aptitudes can be stored. Potential employers can also input sets of data, corresponding to their requirements for potential employees, and the portable processor can be connected to the employer's computer, which can be a central data processing system or a similar portable processor, in order to obtain a quick matching of the applicant's qualifications with the qualifications required for a particular position.

Figure 7:
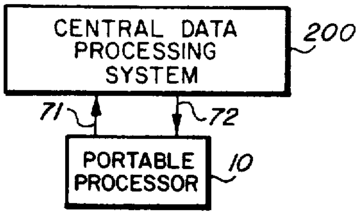
FIG. 7 is a block diagram illustrating inputting of data from a portable processor to a central data processing system.
Figure 8:
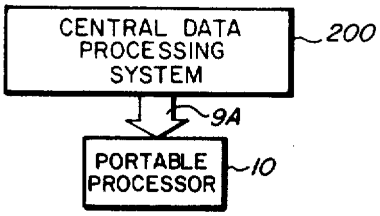
FIG. 8 is a block diagram illustrating a central data processing system modifying the stored program of a portable processor.

Another category of personal data which can be stored in a portable processor of the invention is medical history data. This type of information can then be inputted to a central data processing system of a hospital or insurance company. The embodiment of the invention shown in FIG. 7 includes a portable processor 10 coupled by means of busses 71 and 72 to a central data processing system 200. Thus, the portable processor can be utilized not only as a data comparison device, but also as a data storage device utilized as a means for conveniently inputting a large amount of personal data concerning an individual into a larger data processing system for analysis by the larger data processing system. The later data processing system can then modify or update (on the basis of a physical examination, for example) the stored data, and write it back into the portable processor 10.

It should be noted that the size of random access memory 22 can be increased to accommodate as many items of data as desired. In one embodiment of the invention the random access memory is partitioned (by the software) into blocks, each of which contains or stores a different type of personal data. The stored program includes a plurality of different algorithms, each suited to processing data stored in the various data blocks and, if desired, to comparing that data with corresponding data received from another portable processor. For example, in the previously described embodiment of the invention, wherein data pertaining to personality and personal preference variables suited to determining a compatibility score with a person of the opposite sex by comparison with corresponding data for another person, such data can be subdivided into blocks or subsets of data related to different personality variables, such as dominance, personal autonomy, introspection, sex drive, and the like. According to one embodiment of the invention, different stored algorithms compare process such different subsets of data categories and produce separate "compatibility" scores for each such subset, as well as an overall personal compatibility score. One embodiment of the invention has additional or dual function input keys to allow the user to select and display the separate subgroup scores. In one embodiment of the invention, the additional input keys are utilized by the user to select any particular subgroup or combination of subgroups of data. The portable processors then perform the previously described transmitting and comparing operations only for the selected subgroup or subgroups. A compatibility score is then computed and displayed only for the selected subgroup or combination of subgroups.

In the above-described embodiment, wherein the stored data relates to professional qualifications of a person, that person inputs data into the portable processor in response to a questionnaire presented to him by a potential employer, trade or professional organization. Supervisors of various organizations within the firm needing employees input the needs of their respective organizations into portable processors in response to another questionnaire. Such information can alternatively be inputted into a central data processing system. Either way, the applicant can be quickly "matched" to those specific areas of the corporation most closely suited to his talents. The data can be entered in subsets in order to achieve more specific matching or correlation between the potential employee's needs and the employer's needs. Certain subsets of data can be slanted toward the overall needs of the corporation as a whole, and additional levels of data which vary to specific professional or technical areas can subsequently be compared, if the initial processing does not result in elimination of the applicant from consideration.

Another embodiment of the invention provides a plurality of stored algorithms for controlling the comparing of sets of data, wherein certain algorithms are utilized to cause a comparison of data stored in that particular portable processor with data stored in another portable processor, wherein the first portable processor is a "later generation"]device with improved stored data processing algorithms, but retaining the capability of interfacing with "early generation" portable processors having older algorithms which compare and evaluate data in a different manner than the improved algorithms, which are developed on the basis of experience and research.

Yet another embodiment of the invention utilizes an electrically reprogrammable read only memory and means for coupling the electrically reprogrammable read only memory to a central data processing system which alters or updates the operating software of the portable processor by "writing" improved algorithms in the electrically reprogrammable read only memory. This capacity permits the portable processor to be utilized as a research tool, wherein algorithms for comparing data and producing compatibility factors are improved on the basis of experience and research to provide an improved and more reliable measure of compatibility of two individuals as potential marriage partners, or as employer and employee, etc.

Another embodiment of the invention includes a control which permits a first portable processor to retain the personal information received by the first portable processor from a second portable processor during the above described data comparison operation. The data can be retained in the first portable processor with permission of the owner of the second portable processor, wherein the permission is given in the form of activation of the control of the second portable processor, enabling the information to be retained in the first portable processor. The owner of the first portable processor unit can then input this information into a centralized data processing system to obtain a more comprehensive analysis of his or her compatibility with the owner of the second portable processor.

Figure 9:
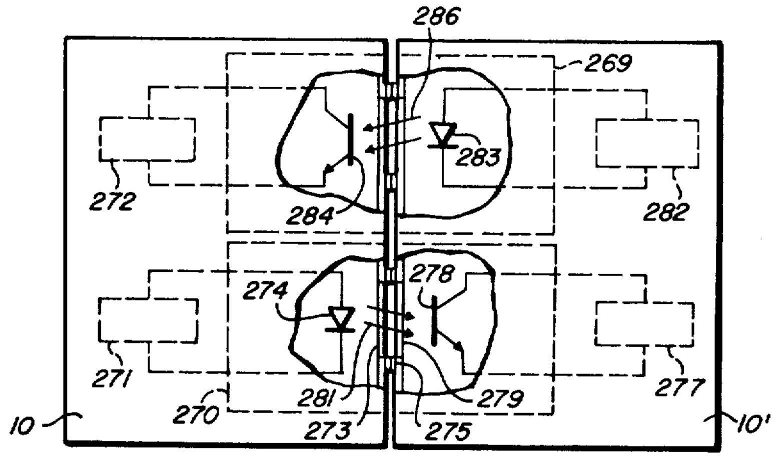
FIG. 9 is a diagram showing optical coupling devices to effect transmission of data between two portable processors.

FIG. 9 shows an embodiment of the invention which avoids the need for sockets 70', 71', and 72' and corresponding extendable prongs 70, 71 and 72 of FIG. 1. In FIG. 9, portable processors 10 and 10' in combination include two optical couplers designated by reference numerals 269 and 270. Optical coupler 270 includes a light emitting diode 274 housed within portable processor 10 and connected to and controlled by circuit 271 responsive to transmit conductor 72 of FIG. 3B. Circuitry 271 for activating light emitting diode 274 can readily be implemented by those skilled in the art, and therefore the details are not set forth herein. Portable processor 10 includes a transparent window designated by reference numerals 273, which window permits light emitted by light emitting diode 274 to propagate to the base of photo-transistor 278. Photo-transistor 278 is housed in portable processor 10' and is positioned adjacent a second transparent window 279 in portable processor 10', so that light, designated by reference numeral 281, emitted by light emitting diode 274 propagates to photo-transistor 278, increasing its collector-emitter current. The increased collector-emitter current of photo-transistor 278 is detected by circuitry 277, which circuitry is connected to a receive conductor such as receive conductor 70 of FIG. 3B. Circuitry for detecting the increased photo-transistor collector-emitter current to produce a corresponding digital signal to be applied to the receive circuitry of portable processor 10' can readily be implemented by those skilled in the art. Consequently, circuitry 277 is not set forth in detail. Seal gaskets, designated by reference numeral 275, are formed around the perimeters of transparent windows 273 and 279 to prevent loss of light and reception of spurious light during communication of data between portable processor 10 and portable processor 10' by means of optical coupler 270.

Optical coupler 269 is formed, similarly to optical coupler 270, except that light emitting diode 283, responsive to circuitry 282, is housed in portable processor 10', and photo-transistor 284, whose current is detected by circuitry 272, is housed in portable processor 10. Thus, each portable processor can transmit data to the other and receive data from the other, so that the two data sets stored in the respective portable processors can be compared in the manner as previously described with respect to FIGS. 1, 3A and 3B.

Figure 10:
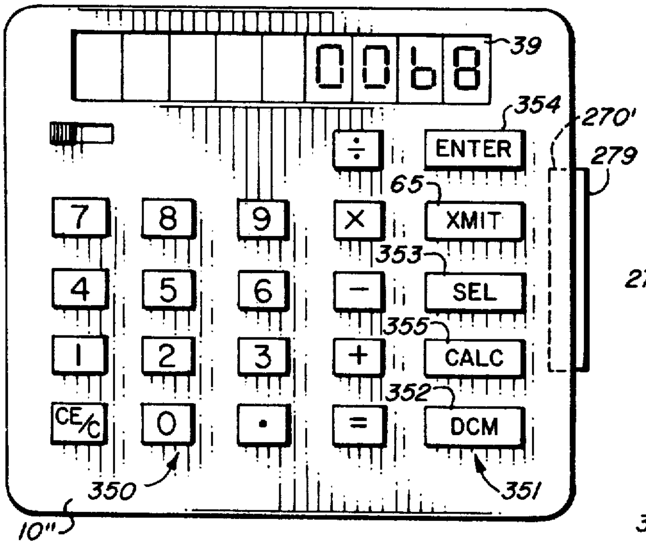
FIG. 10 is a diagram of a data comparison processor incorporated in a pocket calculator.

The portable processor of the invention can be incorporated in combination with a variety of other electronic computing devices, such as an ordinary pocket calculator 10'' shown in FIG. 10. Pocket calculator 10'' includes an ordinary calculator keyboard, generally designated by reference numeral 350. However, pocket calculator 10'' also includes a group of keys generally designated by 351 for permitting operation of pocket calculator 10'' as a portable processor to compare a set of personal data stored therein with corresponding sets of personal data stored in other mateable portable processors. Pocket calculator 10'' includes a "data comparison mode" inout key 352 for activating circuitry such as the circuitry shown in FIGS. 3A and 3B to set device 10'' in the data comparison mode. "Calculate mode" key 355 sets pocket calculator 10'' to a mode wherein keyboard 350 activates conventional calculator circuitry (not shown) to provide ordinary calculator functions such as add, subtract, multiply, and divide. For either mode of operation, alphanumeric display unit 39 displays the results of operation, of pocket calculator 10 in either the calculator mode or in the data set comparison mode. "Select" key 353 permits displaying of the values of an X-Y data pair number inputted to pocket calculator 10'' when it is in the data comparison mode utilizing keys 350. "Enter" key 354 permits entry of X and/or Y of a previously selected X/Y data pair selected by means of "select" key 353 and keyboard 350. The respective X and Y values are selected by means of keyboard 350. Transmit key 65 operates in the manner previously explained with respect to FIGS. 1, 3A and 3B. Device 10'' can communicate with another portable processor by means of optical coupling devices 270', which includes a light emitting diode and a photo-transistor, housed in separate compartments and as explained previously with reference to FIG. 9. Alternatively, extendable prongs and corresponding sockets can be utilized, as previously explained with respect to FIG. 1.

Figure 11:
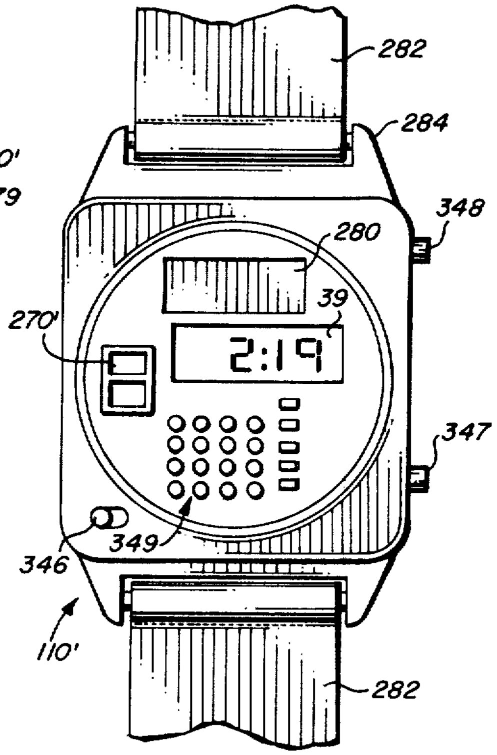
FIG. 11 is a partial diagram of a wristwatch incorporating a data comparison processor and a calculator.

The portable processor data comparison device of the present invention can be incorporated within an electronic wristwatch, as shown in FIG. 11. The embodiment 110' shown in FIG. 11 incorporates housing 284 and wristband 282. Liquid crystal display 39 displays the time of day when the wristwatch processor 110' is operating in the "time" mode, and displays the values of the X-Y data pairs being entered, as previously explained, or the results of a comparison of a stored set of personal data with a stored set of personal data of a separate unit, as previously explained. A miniature keyboard, generally indicated by reference numerals 349, includes data input keys and control keys, and, if an electronic calculator is also incorporated in wristwatch/processor, 110', the usual calculator function keys. The keys are sufficiently small to be depressed with a pencil tip or the like. A solar panel 280 is incorporated to provide power to charge the batteries which operate the timekeeping, computing, and data processing circuitry incorporated in this embodiment of the invention. Additional control keys such as 346, 347 and 348 are mounted on the front and sides of housing 284 to permit the user to easily change modes of operation of the device. An optical coupling unit 270' includes a photodiode in one compartment and a phototransistor in another compartment, so that each can be mated with a corresponding optical coupling unit of a separate portable data processing device to permit bidirectional transmission of data between unit 110' and a corresponding unit.

In an embodiment of the invention shown in FIG. 12, hereinafter referred to as the "improved system 325", a low power CMOS (complementary MOS) RAM 24' is utilized to store the personal data of the owner or primary user of the personal processor. Note that hereinafter, system 325 can be thought of as replacing the "first processor" previously referred to. The power of consumption of RAM 24' is so low that there is no significant drain on the batteries powering improved system 325. An improved commercially available microprocessor, namely a National Semiconductor COPS 444 N channel four bit microprocessor can be utilized to implement microprocessor 12' and includes 2048 eight bit words of read only memory and 128 words of four bits each of random access memory (hereinafter referred to as the "on board RAM 24''"). The National Semiconductor COPS 420L four bit processor, with 1024 eight bit words of RAM and 64 four bit words of RAM thereon can also be utilized to implement RAM 12' of FIG. 12. The improved system 325, in conjunction with the program shown in the flow chart of FIGS. 3-17, is capable of executing the basic algorithm previously described with or without a second processor. In other words, personal data for another person, hereinafter referred to as "secondary data" can be received directly by improved system 325 via keyboard keys 225 instead of via optical coupling with a second processor unit, if desired. Also, as subsequently explained, the embodiment of the invention shown in FIG. 12 is programmed to operate in conjunction either with a second processor which executes the program represented by FIGS. 6A-6E, or in conjunction with a second processor which is identical to improved system 325.

If system 325 receives secondary data via its keyboard, the owner's set of personal data (hereinafter referred to as "primary data") having been previously loaded into CMOS RAM 24'; after the primary user's primary data has been loaded into RAM 24', the "F" key 225F is depressed, causing an "F" flag to be stored in the on board RAM 24''. This sets system 325 up to receive the secondary data, which consists of a number of "X" and "Y" responses of a second person other than the owner of system 325 to the same 96 questions which are responded to by the owner to obtain a group of "X" and "Y" responses of which the primary data consists. This is referred to as secondary data, which would ordinarily be a second persons' personal data. Alternatively, the secondary data might be "normalized" data with which the primary user or owner of the system 325 can compare his own stored primary data.

Figure 12:
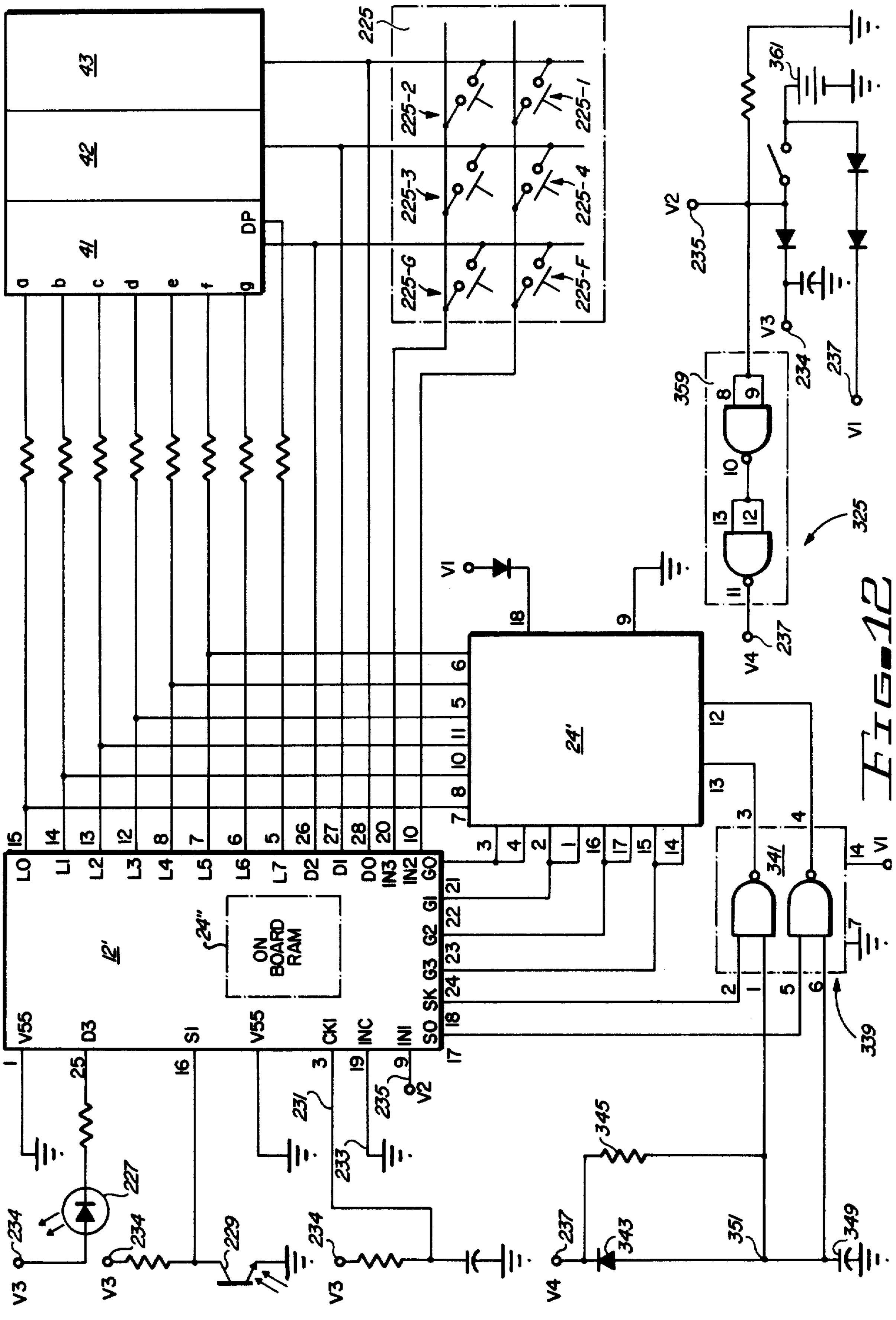
FIG. 12 is a schematic diagram of another embodiment of the invention.

Still referring to FIG. 12, microprocessor 12' has its four bi-directional data bus lines G0, G1, G2 and G3 coupled to the corresponding four data input and data output terminals of random access memory 24', which can be implemented by means of a National Semiconductor 74C 910 sixty-four word by four bit RAM. Eight output ports L0-L7 of microprocessor 12' are connected to three numeric display elements 41, 42 and 43, which can be implemented entirely similar to display elements 42, 43 and 44 of FIG. 3B. Output lines D0, D1, and D2 are also connected to display elements 41, 42 and 43. Output D2 is further connected to one pole of switches 225-G and 225-F; output D1 is connected to a first terminal of each of switches 225-3 and 225-4. Output D0 is connected to a first terminal of each of switches 225-2 and 225-1. Input IN3 of microprocessor 12' is connected to a second terminal of each of switches 225-1, 225-4 and 225-F. Input IN2 is connected to a second terminal of each of switches 225-F, 225-4 and 225-1.

In order to display a degree of compatibility between the primary and secondary sets of data, a score from 0-100 is displayed by display elements 41, 42, and 43; hence three numeric display elements are required for this purpose. The question number (a number from 1 to 96) corresponding to each character by means of keyboard 225 is displayed by display elements 41 and 42. When data is being entered into system 325 via keyboard 225, the data, represented by one of the characters 1–4 for each "X" response and for each "Y" response, are displayed by means of display element 43. The 96 questions are grouped in six subcategories, numbered 1 through 6, respectively. In one mode of operation, display element 41 displays the subcategory number of the questions for which a compatibility sub-score is to be computed and displayed. Simultaneously, display elements 42 and 43 display a percentage compatibility score between the primary and secondary data corresponding to the selected sub-category. Display element 41 also displays a "period".

The system shown in FIG. 12, in conjunction with the software of FIGS. 13–17, is capable of displaying a total compatibility score and also of displaying the compatibility between the data corresponding to each of the six subgroups of questions.

For example, in operation, the user activates "go" switch 225-G once. System 325 performs all of the comparisons between all primary and secondary data stored in system 325 in accordance with the previously described algorithms and displays a comparison score indicating the degree of compatibility between the entire amount of primary and secondary data.

If the "go" switch 225-G is activated a second time, a comparison score for the first subgroup of data corresponding to the "X" and "Y" responses to the first subgroup of questions is displayed. If the "go" switch 225-G is activated again, a comparison score for the second subgroup of data is displayed. As "go" switch 225-G is repeatedly activated, compatibility scores between the remaining subgroups of data are respectively displayed.

In the presently described embodiment of the invention, the first subgroup of questions is directed to the topic of habits and manners, the second subgroup is directed to the topic of achievements and status, the third subgroup is directed to the topic of beliefs and contemplations, the fourth subgroup is directed to the topic of interests and energy, the fifth subgroup is directed to the topic of tradition and family, and the last subgroup is directed to the topic of sex and pleasure.

The input IN0 is connected to a ground conductor 233 in order to cause microprocessor 12' to function with external random access memory 24' connected thereto. The voltage V2 on conductor 235 is utilized to detect a decrease in the power supply voltage so that when the main power is turned off, microprocessor 12' can execute a typical "turn off" routine to effect transferring of important data in microprocessor 12' to RAM 24'. A small battery 361 causes voltage V1 to be applied to conductor 237', supplying sufficient power to CMOS RAM 24' to prevent loss of any data stored therein when the main power is turned off.

The S1 data input lead of microprocessor 12' receives serial data from the collector of photo-transistor 229, which is activated by a light-emitting diode such as 227 from a second processor with which system 325 is optically coupled in order to effect comparing of the set of personal data in system 325 with the set of personal data stored in the second processor. The D3 output of microprocessor 12' energizes light emitting diode 227 in order to effect transmission of serial data from system 325 to a second processor unit, in the manner previously described herein.

Outputs L0-L7 of microprocessor 12' are connected to LED (light emitting diode) drivers in microprocessor 12' and are connected to display elements 41, 42, and 43 (which are implemented by means of any of a wide variety of commercially available LED display devices).

Outputs D0-D2 are used for strobing LED display units 41, 42, and 43.

Outputs L0-L6 of microprocessor 12' function as the address inputs necessary to select one of the 64 words in RAM 12' to be displayed on display elements 41, 42 and 43. The two NAND gates indicated by reference number 341 in FIG. 12 each have an input connected to microprocessor 12' and an output connected to random access memory 24' in order to control whether the addressed location of random access memory 24' is to be written into or read out of. The two NAND gates designated by reference numeral 359 generate a voltage V4 on conductor 237 in order to provide power to write control circuitry including NAND gates 341, resistor 345, diode 343 and capacitor 349. V4 is at zero volts when the main power is off, preventing inadvertent writing of random data into RAM 24' when it is in its "standby" state, powered only by battery 361.

The program for causing system 325 to operate in the above described manner is now best described with reference to the flow charts of FIGS. 13–17.

Figure 13:
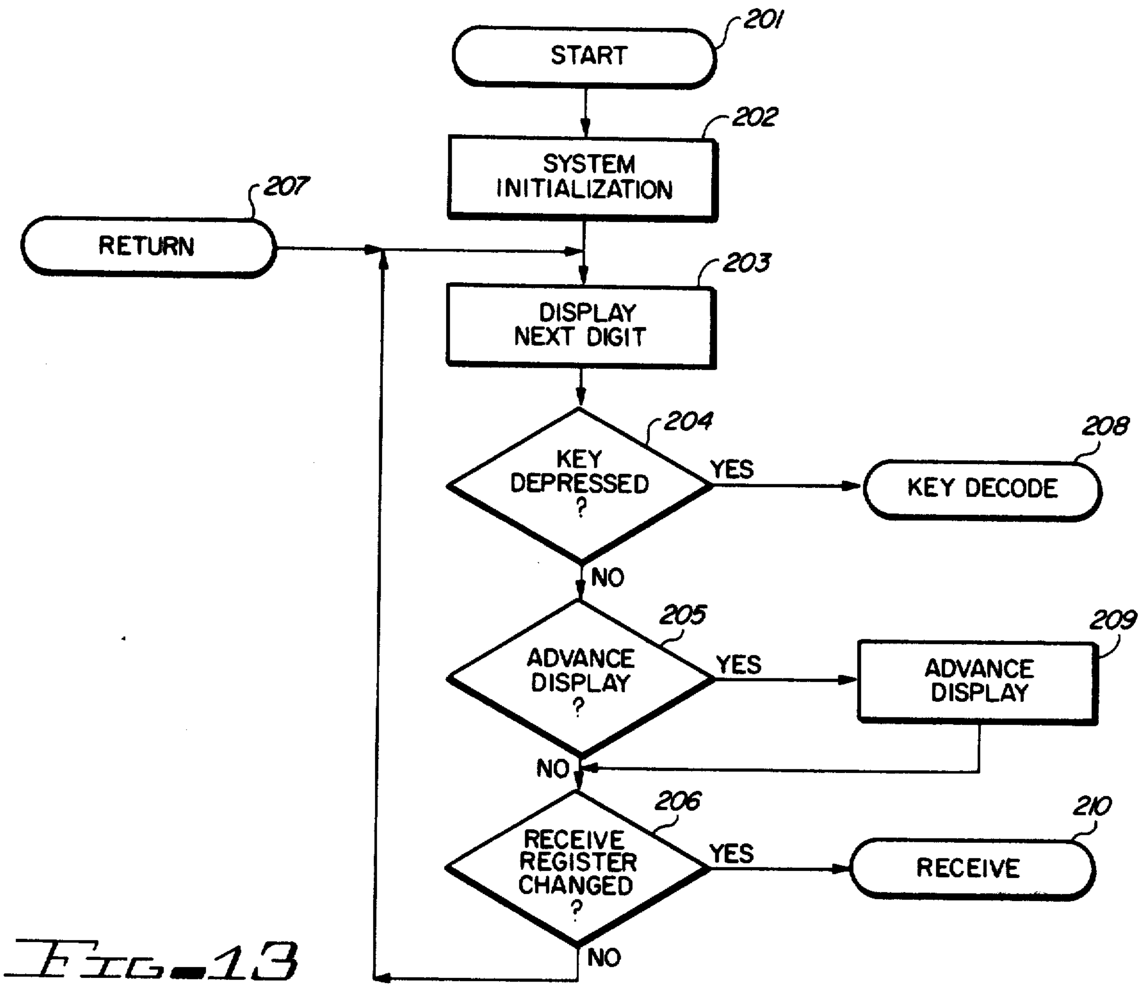
FIGS. 13–17 constitute a flow chart of a program executed by a processor in the embodiment of the invention shown in FIG. 12.

Referring specifically to FIG. 13, the program begins execution at label 201, and performs a system initialization function, as indicated by block 202. The system initialization operation includes initializing the contents of various hardware and software registers in system 325 in order to make the operating program function. System initialization functions must be performed for all programmable computing systems, and the details of the routine performing the system initialization functions depend on the precise configuration of the hardware in the system. Such details can be readily implemented by those skilled in the art and therefore are not described herein. The program then enters block 203 and executes a subroutine which causes the next digit to be displayed by means of display elements 41, 42 and 43. This involves retrieving the next digit from an appropriate register in system 325 and transmitting code representing that digit to appropriate ones of display elements 41, 42 and 43 of FIG. 12. It should be noted that there are three separate portions of random access memory 24' which are reserved as registers for storing the digits to be displayed on display elements 41, 42 and 43, respectively.

In decision block 204, the program determines whether any of keys 225 are depressed. If it is determined that one of keys 225 is depressed, the algorithm enters a key decode subroutine, as indicated by reference number 208 (described in FIG. 14). If no key has been depressed, the program enters decision block 205 which determines whether an "advance display" (subsequently explained) bit has been set in system 325. If the advance display bit has been set, the program enters block 209, and performs the function of "advancing" the display, that is, causing display elements 41, 42 and 43 to display the next digits to be displayed. If it is determined in decision block 205 that the advance display bit has not been set, the programs enters decision block 206 directly, but if the advance display bit has been set, the program enters decision block 206 after performing the advance display function indicated by block 209. If information in a register referred to as the "receive register" has been changed (as subsequently explained), indicating that a second processor has been optically coupled to system 325 (by means of LED 227 and photo-transistor 229 of FIG. 12) and a pulse from the second processor had been received by the first processor, the program enters a receive subroutine, as indicated by label 210. (The "receive register" is an internal decrementing binary counter in microprocessor 12').

The advance display function indicated in block 209 of FIG. 13 tests a flag bit in system 325, and if an advance display bit has been set, the program displays the answer or data entered in response to the next numbered question. If the "F" key has been depressed to set the "F" flag, and the "two" key has been depressed, the "F" flag will have been reset. Also, the advance display function of block 209 can cause the question number for which previously entered answers are to be displayed to be decremented by one. This is accomplished when the "F" flag has been set and the "three" key has been depressed, setting a "display answer flag". This enables the user to decrement the question numbers and display the corresponding answers which have been entered by means of keyboard.

The display digit function performed in block 203 causes the display elements 41, 42 and 43 to be strobed, causing the digit, represented by the binary coded decimal code on lines L0-L7, information to be displayed by display elements 41, 42 and 43 .

If the contents of the above-mentioned receive register have been changed, as determined by decision block 206, this means that the receive register of system 325 has received a pulse from the above-mentioned second processor. In this event, the program enters the receive routine, (which is shown in the flow chart of FIG. 16) as indicated by label 210 in FIG. 13. Otherwise, the program returns to the beginning of the display routine, as indicated by label 207.

Figure 14:
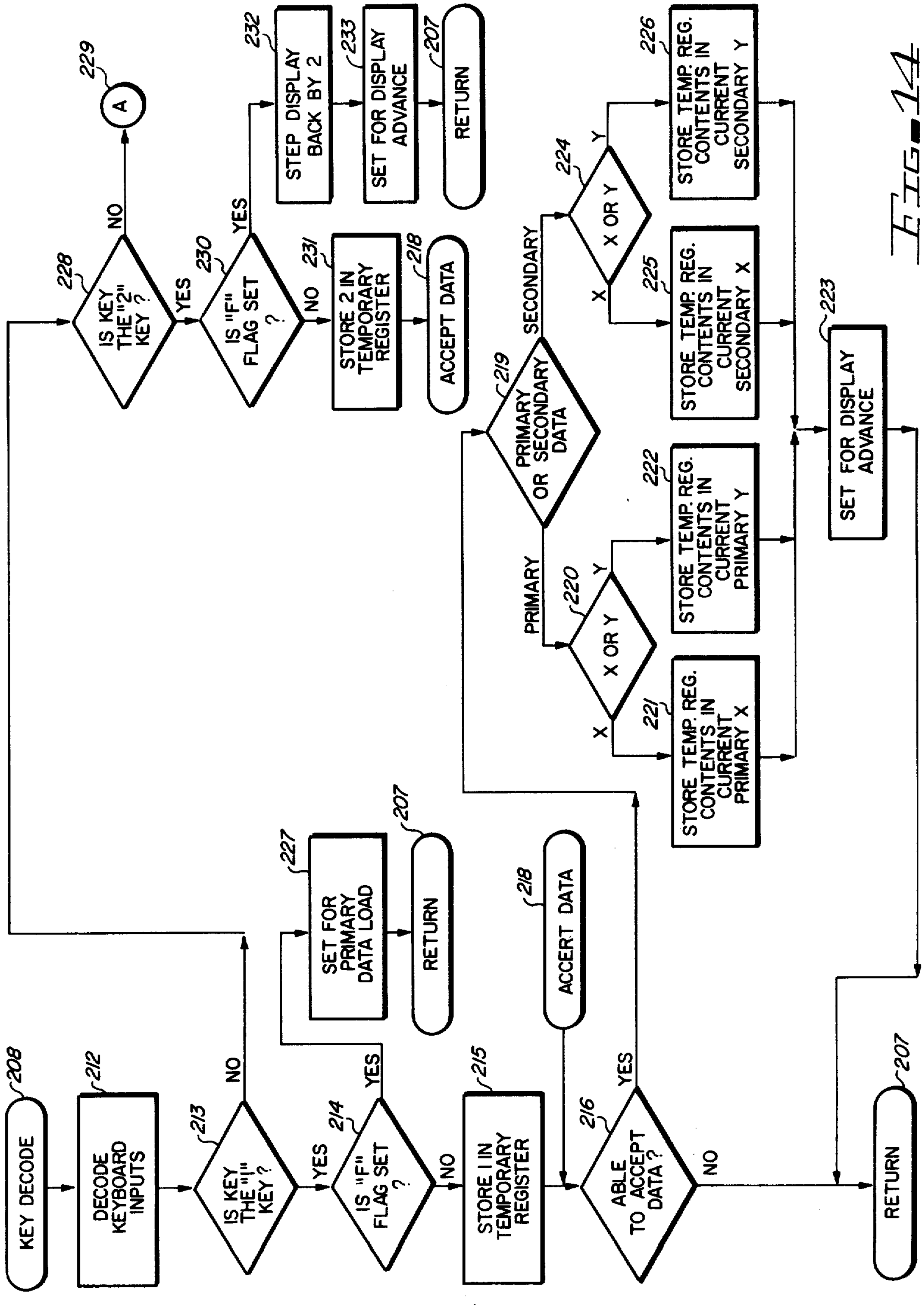

Referring now to FIG. 14, the above-mentioned key decode routine is entered at label 208. The program enters block 212 and simply decodes the input signals which are received from various ones of keys 225. Information stored in the microprocessor memory is utilized to decode the keyboard signals. Decoding of keyboard signals by means of information stored in a memory is very well known in the art, and therefore is not described in detail. For example, suitably programmed RAMs are widely used as decoders. The program then enters decision block 213, which determines whether the key which has been depressed is the "one" key 225-1. If the depressed key is the "one" key, the program enters decision block 214 and determines if the "F" key designated by reference 225-F in FIG. 12 has been utilized to set a flag, referred to as the "F" flag (subsequently explained), in system 325. If the "F" flag has been set, the program enters block 227, which sets a register establishing microprocessor 12' in a state which allows the above-described "primary" data to be loaded. The "primary" data is data which is permanently or semi-permanently stored in CMOS RAM 24', and normally is the personal data of the owner of system 325. The program then returns to the display routine of FIG. 13 as indicated by label 207. If the "F" flag has not been set, then the program enters block 215, and stores the value "1" in a temporary register in system 325. The program then enters decision block 216, which determines if the processor is in its load primary data mode or its load secondary data mode. If system 325 is not in either load mode, the program is unable to use the value stored in the temporary register (block 215). In this event, the program returns to the display loop, as indicated by label 207. More specifically, in decision block 216, the program determines if either a primary data load flag or a secondary data load flag in system 325 have been previously set by the program. If neither of these flags has been set, the program returns to the display loop.

If one of the two foregoing flags has been set, the program enters decision block 219 and determines whether the primary or secondary data load flag is set. If the primary data load flag is set, the program enters decision block 220, and determines whether it was "X" or "Y" information that was inputted by means of the depressed key.

If the key which was depressed represents "X" information, the program enters block 221, and stores the contents currently in a "primary X location" into a temporary register. The current "primary X" location is X information containing location of one of the memories of system 325 to which the program is presently points. The numerical value which was stored in the temporary register in block 215 is transferred from the temporary register and is stored in the primary X location of RAM 24', which corresponds to the question being responded to.

Similarly, if the data number inputted by the "one" key (as determined in decision block 213) is a "Y" data number, the program enters block 222 and stores the contents of the temporary register (written in block 215) in the corresponding primary Y location corresponding to the question being responded to.

If it is determined in decision block 216 that the secondary data flag had been set, the program enters decision block 224 instead of decision block 220. If the inputted number is an "X" number, the contents of the temporary register are stored in the "on board" memory of microprocessor 12', in a secondary "X" portion of the memory location corresponding to the question being responded to. If the inputted number is a "Y" number, the contents of the temporary register are instead stored in a "secondary Y" portion of the memory location corresponding to the question being responded to.

After completing the appropriate one of the functions indicated by blocks 221, 222, 225, or 226, the program enters block 223 and sets the "advance display bit" previously referred to in conjunction with the decision block 205 of FIG. 13. This means that the program is ready to advance to the next question by entering the appropriate X and Y numbers necessary to respond to that next question. The program then re-enters the display loop of FIG. 13 via label 207.

If the decision made in decision block 213 of FIG. 14 is that the depressed key is not a "one" key, the program then enters decision block 228 and determines whether or not the depressed key is the "two" key 225-2 of FIG. 12. If it is not, the program is routed via label 229 to decision block 235 of FIG. 15. However, if the depressed key is the "two" key, the program enters decision block 230 and determines whether or not the "F" flag bit has been set. If the "F" flag bit has been set, the program steps a display counter in system 325 back by two questions, as indicated in block 232. Next, the program sets the display advance bit previously mentioned and returns to the display loop via label 207. The effect of setting the display advance bit in block 233 is to cause the "advance display" block 209 in FIG. 13 to advance the display counter by one, so the net effect of the procedure encompassed by blocks 232 and 233 (FIG. 14) is to simply decrement the display by one.

If the program determines in decision block 230 that the "F" flag has not been set, the program stores the number "2" in the previously mentioned temporary register, as indicated in block 231, and enters an "accept data" routine indicated by label 218. This label routes the program to decision block 216 of FIG. 14.

Figure 15:
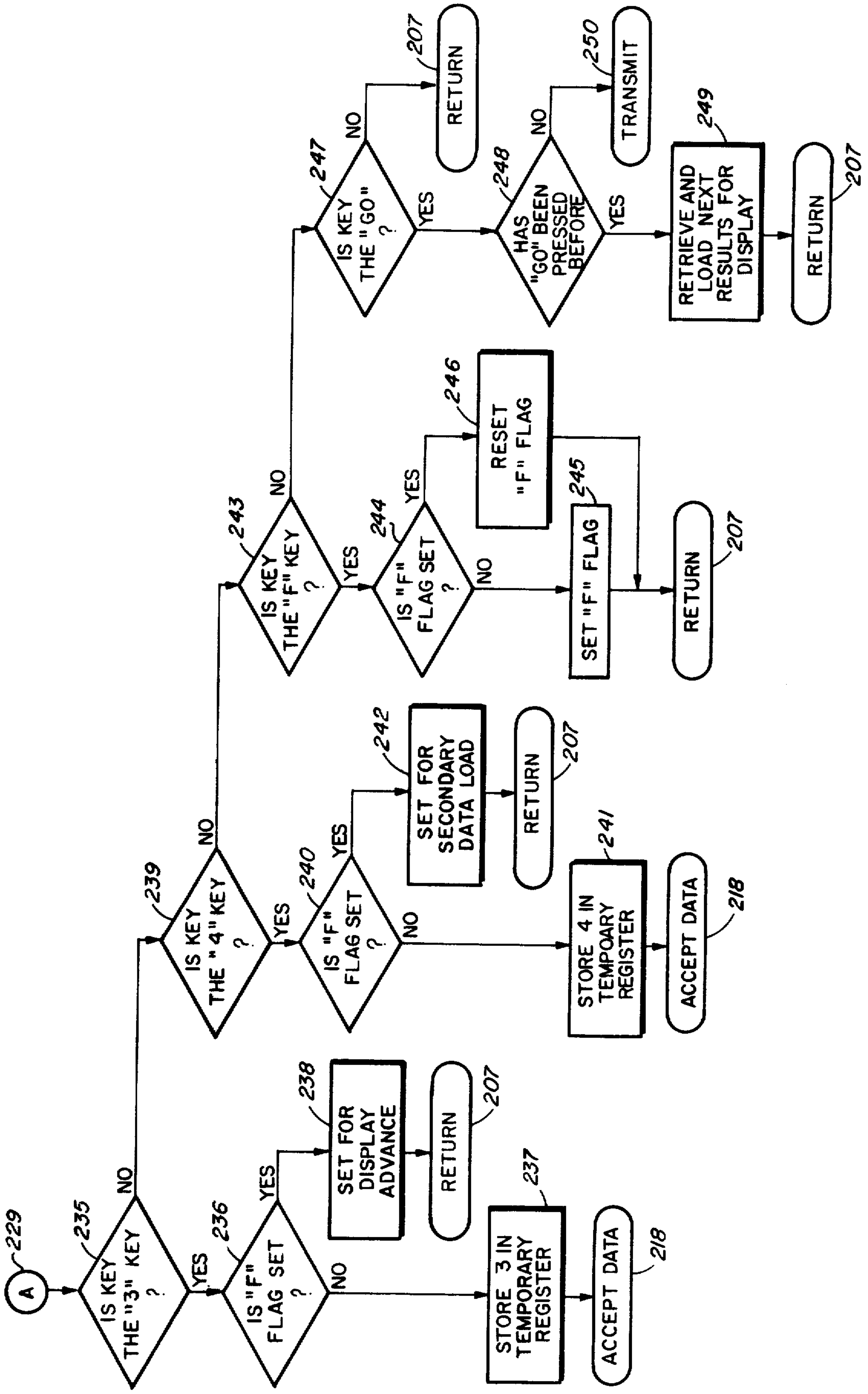

Referring again to FIG. 14, if in decision block 228 it was determined that the depressed key is not the "two" key 225-2, the program enters decision block 235 of FIG. 15 via label 229 and determines whether the depressed key is the "three" key 225-3.

At this point, it should be noted that keys 225-1, 225-2, 225-3, and 225-4 function either as "data" keys capable of entering the digits 1, 2, 3 or 4 or as "function" keys, depending upon whether or not the "F" flag has been set by depressing the "F" key 225-F. In the "function" mode, the function of "one" key 225-1 is to set the primary data load flag previously mentioned, in order to set up system 325 to accept primary data from keyboard 225. The function of the "two" key 225-2 is to cause system 325 to decrement the display. The function of the "three" key 225-3 is to cause system 325 to increment or advance the display. The function of the "four" key 225-4 is to set the secondary data load flag, setting system 325 up to accept secondary data.

Returning now to FIG. 15, note that the "accept data" routine indicated by label 218 causes the program to re-enter decision block 216, ultimately causing the entered data to be loaded into the corresponding "X" or "Y" location, for either primary or secondary data, corresponding to the question being responded to.

Referring to FIG. 15, if the "F" flag has been set, as determined by decision block 236, the program enters block 238, which causes the display to be advanced to display data corresponding to the next question number, and then returns to the display loop via label 207. If the "F" flag has not been set, the program stores the digit "3" in the temporary register, as indicated in block 237 and enters the "accept data" routine via label 218.

If the depressed key is not the "3" key, the program enters decision block 239 to determine if the depressed key is the "4" key 225-4. If it is, then the program enters decision block 240 and determines whether or not the "F" flag has been set. If the "F" flag has been set, the program enters decision block 242 and sets the above-mentioned "secondary data load" bit to a logical "one" and returns to the display loop of FIG. 13 via label 207. If the "F" flag has not been set, the program enters block 241 and stores the digit "4" in the temporary register and then enters the "accept data routine" (beginning with decision block 216 of FIG. 14) via label 218.

If the depressed key is not the "4" key, the program enters decision block 243 and determines whether the depressed key is the "F" key. If the depressed key is the "F" key, the program enters decision block 244 and determines whether the "F" flag bit has been set. If the "F" flag has been already set, the program re-sets the "F" flag, as indicated in block 246. If not, the program sets the "F" flag bit, as indicated in block 245. In either event, the program then re-enters the display loop via block 207. (Thus, the "F" flag bit is set and reset by alternately depressing the "F" key 225-F).

If the depressed key is not the "F" key, the program enters decision block 247 and determines if the depressed key is the "G" or "GO" key 225-G. If that key has not been depressed, the program re-enters the display loop via label 207. If the "GO" key has been depressed the program enters decision block 248 and determines whether the "GO" key has been depressed before. If the "GO" key has not been depressed before, the program enters the "transmit" routine (FIG. 17) via label 250. If the "GO" key has not been depressed before, the program enters block 249 and retrieves and loads the next results for display. Note that system 325 includes a software "GO" register which is incremented by depressing of "GO" key 225-G. This register stores the category number (a number having a value from 1 to 6). The program uses the category number to effect selecting of the percentage compatibility score between the "X" and "Y" data corresponding to the selected subcategory of questions. The number of times that the "GO" key has been pressed determines which "subset" of compatibility scores are to be displayed. The program then returns to the display loop via label 207.

Returning now to block 206 of FIG. 13, if the program determines that the contents of the "receive register" have changed, then the program enters decision block 252, and determines whether the light emitting diode 225 of FIG. 12 is still on. This means that the program checks to see if a pulse sent out by a second processor (to which system 325 is optically coupled by means of a light emitting diode such as 227 and phototransistor 229) is present. If the pulse is a sufficiently short pulse, decision block 252 determines that the program represented by the flow chart of FIGS. 13–17 is contained in the second processor. This is the situation if the light emitting diode of the other processor is not still on, and the program then enters block 253, and causes the system 325 to send a "ready" pulse via light emitting diode 227 to the second processor. However, if the light emitting diode of the second processor is still on, this means that the program represented by the flow chart of FIGS. 6A–6E is contained in the second processor. In this event, the program in system 325 executes blocks 259–265, which are identical to blocks 160–166 of FIG. 6B. This allows system 325 to receive data in the format produced by execution of the program of FIGS. 6A–6E by the second processor. Blocks 259–267 are identical to blocks 160–168 of FIG. 6D and therefore are not re-described.

If it is determined in decision 252 that the light emitting diode (such as 227) of the second processor is not on, and that therefore the program of FIGS. 13–17 is stored in the second processor, the program in system 325 then sends a ready pulse, as indicated in block 253, and then in decision block 254, waits until a software timer represented by decision block 254 reaches a predetermined count. After a predetermined amount of time has elapsed, the program then enters block 255, retrieves the data (from its own receive register) received from the second processor and stores it in the appropriate locations of the "on board" memory 24' of microprocessor 12'. (Note that the receive register can be a serial I/O register. Since the value it contains is achieved by decrementing with serial incoming pulses, its contents must be complemented to attain the correct value of the data therein). After all of that data has been stored, the program enters block 257 and processes all of the X-Y data pairs internally stored. When the processing of block 257 is complete, the program enters decision block 258 and sends the resulting score to the second processor.

The routine executed in block 257 involves execution of the "process X" routine, entered at label 270, and the "process Y" routine entered at label 277, which are identical to the "process X" and "process Y" routines of FIGS. 6C and 6E, respectively. The routine executed in blocks 265 and 267 also includes steps essentially similar to the steps performed in block 257.

Figure 16:
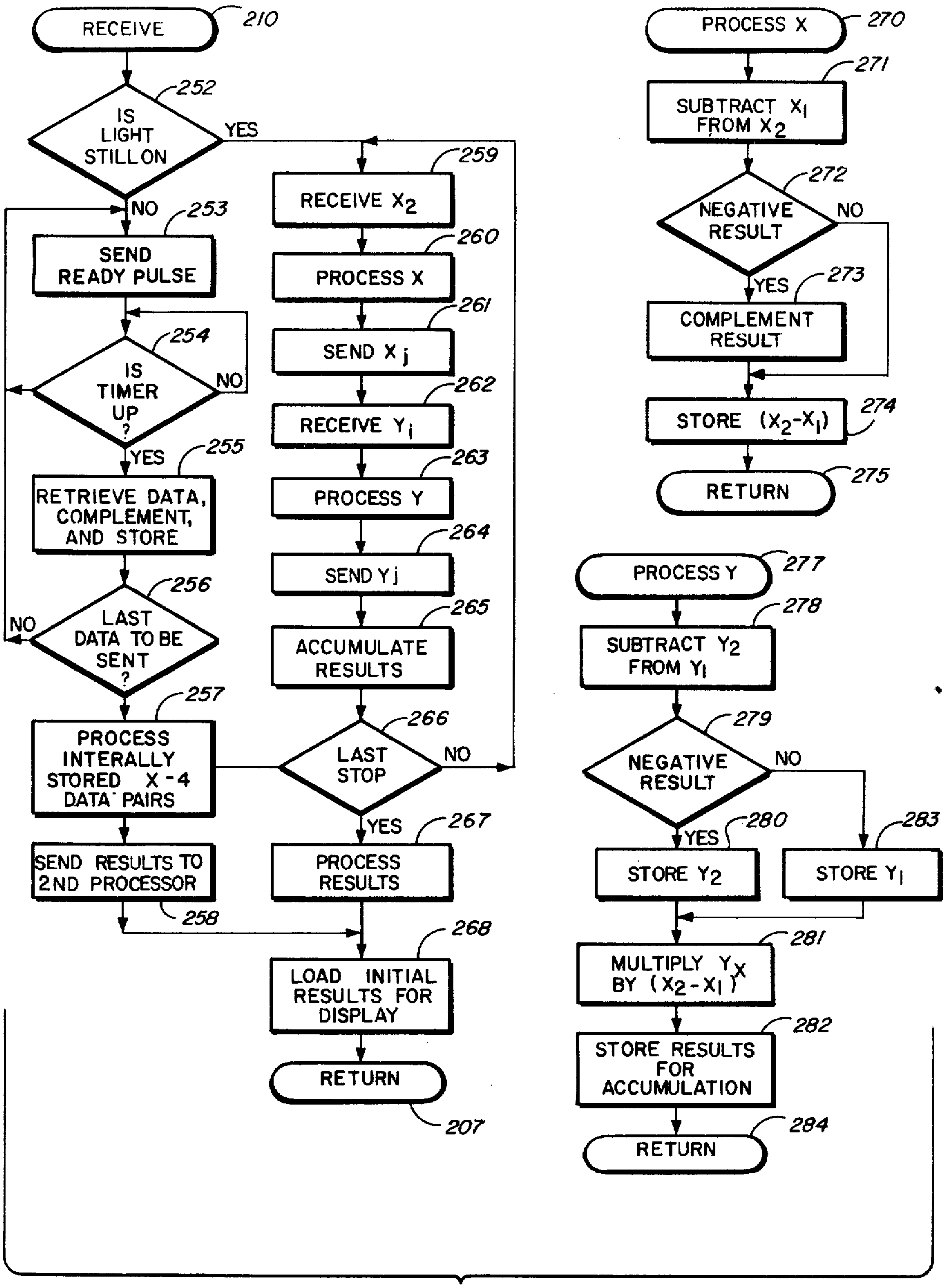

Note that the loop between block 253 and decision block 256 in FIG. 16 enables the program of FIGS. 13-17 to effect communication with the second processor much more rapidly if the second processor contains the program of FIGS. 13-17 processor than if it contains the program of FIGS. 6A-6E. The program represented by FIGS. 6A-E causes each "X" number and each "Y" number to be received and used in calculations in accordance with the "process X" and "process Y" algorithms of FIGS. 6C and 6E (by a processor executing that program) one at a time, whereas the program of FIGS. 13-17 causes the processor executing that program to wait until it receives all of the "X" and "Y" numbers from the other processor and then performs calculations according to the "process X" and "process Y" algorithms as one uninterrupted calculation and accumulation process. This reduces the amount of time necessary for calculation and accumulation from approximately seven seconds for the program of FIGS. 6A-6E to approximately three seconds for the program of FIGS. 13-17. Executing the process "X" and process "Y" algorithms only after all "X" and "Y" data pairs have been received from the second processor requires only approximately three seconds of computing time, whereas the approach set forth in the program of FIGS. 6A-6E takes approximately seven seconds, which is an inconveniently long amount of time for two persons to hold two units together to attain the necessary data transfer.

Note that in block 257, after all "X-Y" pairs have been received by system 325 from the second processor, for each of corresponding "X" numbers $X_1$ and $X_2$, the "process X" subroutine starting at label 270 in FIG. 16 is executed. Blocks 271, 272, 273, and 274 are implemented in a manner identical to blocks 180, 181, 182 and 183, respectively, of FIG. 6C. Return label 275 of FIG. 16 indicates that the program returns to block 257 and then enters the "process Y" subroutine beginning at label 277 of FIG. 16. Blocks 278, 279, 283, 280 and 281 can be implemented in the same manner of blocks 190, 191, 192, 193 and 194 of FIG. 6E. At this point, the program enters blocK 282, wherein the program accumulates the results and returns to block 257 via label 284, which then causes the program to repeat execution of the "process X" subroutine beginning at label 270 and the "process Y" subroutine beginning at label 277 for the next pair of corresponding X and Y numbers. This process is repeated until all corresponding pairs of "X" and "Y" numbers have been compared and the results have been stored and accumulated. At this point, the program enters block 268 and loads the initial results for display and returns to the display loop via label 207.

Note that if the "process X" subroutine is being jumped to from block 260, then return label 275 causes the program to enter block 261. Similarly, if the "process Y" subroutine is being called up by block 263, then return label 284 causes the program to enter block 264.

Figure 17:
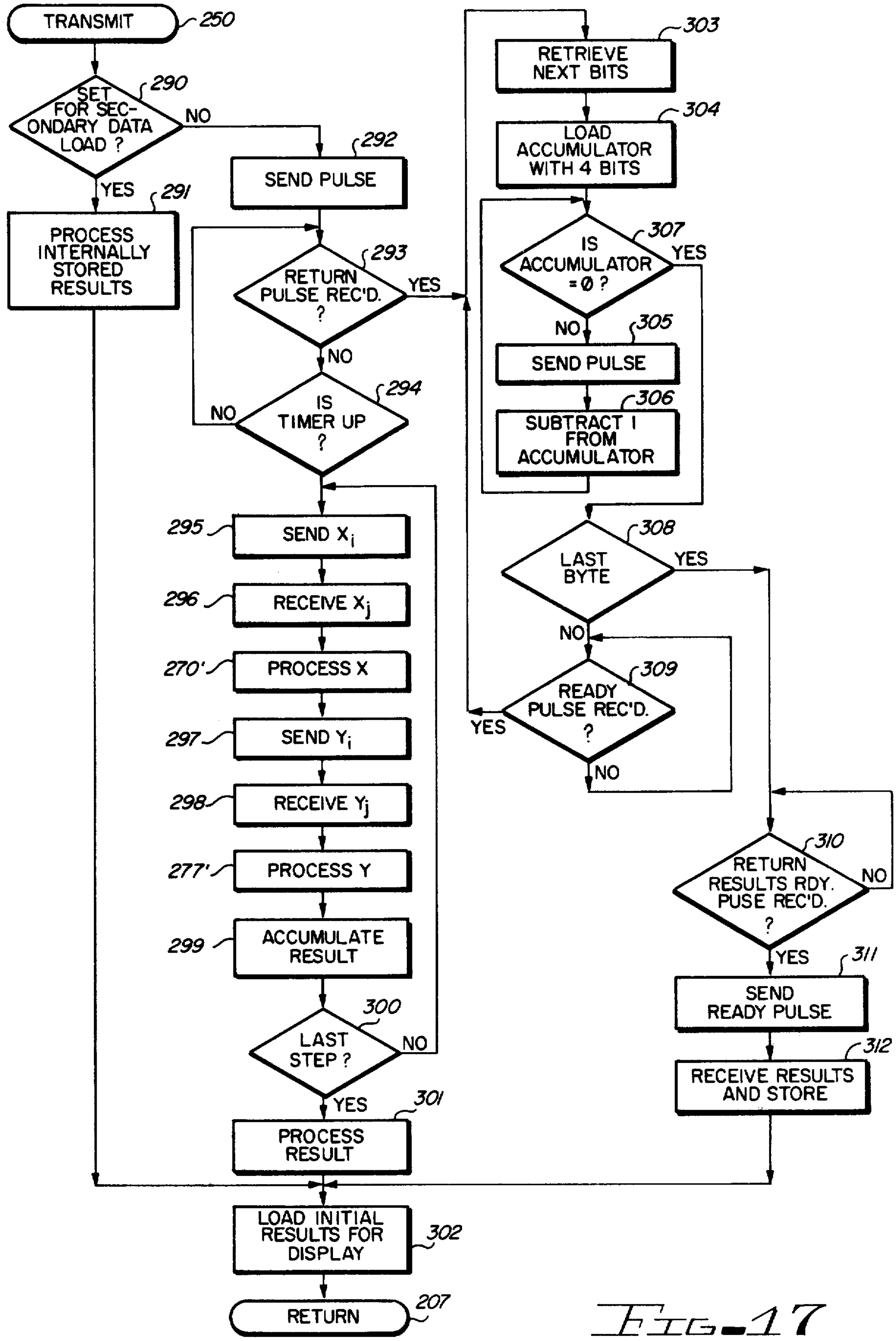

If the results of the determination made in decision block 248 of FIG. 15 is that the "GO" key has not been pressed before, the program enters the "transmit" routine of FIG. 17.

Referring now to FIG. 17, if the "GO" switch has not been depressed before, the transmit routine is entered via label 250, which causes the program to enter decision block 290, which determines whether the above-mentioned secondary data load bit has been set. If the secondary data load bit has been set, the system 325 knows that there is no second processor optically coupled thereto, and performs computations in accordance with the "process X" and "process X" subroutines on the primary and secondary sets of data stored in RAM 24' and in the above-described on-board RAM within microprocessor 12'.

If the secondary data load flag has been set, this establishes that secondary data has been entered via keys 225 into the on-board random access memory and that there is no second processor. The steps performed in block 291 are entirely similar to those performed in block 257 of FIG. 16 and will not be again described in detail. After all of the corresponding "X" and "Y" numbers in the on-board RAM and in RAM 24' have been processed, stored, and accumulated in accordance with the "process X" subroutine (reference numeral 27) and the "process Y" subroutine (reference numeral 277), the program enters block 302 and loads the initial results for display (in the same manner as in block 268 of FIG. 16) and returns to th display loop via label 207).

If it is determined in decision block 290 that the secondary data load flag has not been set, then the subject processor knows that it is connected to a second processor and can transmit data to the second processor. The program therefore enters block 292 and ends a short pulse which changes the receive register of the second processor, letting it known that the first processor also executes a program of the type represented by FIGS. 13-17. Note that this pulse, transmitted by means of the light emitting diode 227, identifies system 325 as one which executes the program of FIGS. 13-17, and changes the above-mentioned receive register if the second processor also executes the program of FIGS. 13-17. If so, the program executed by the second processor machine will determine that the receive register has changed in decision block 206 (FIG. 13) of its own program. The second processor then will send a "ready" pulse (block 253 of FIG. 16). The program executed by system 325 will detect whether or not that pulse, now referred to as a "return" pulse, has been received, and will cause the program to realize that the second processor also executes a program identical to the program of FIGS. 13-17 and will enter block 303. If no return pulse has been received from the second processor, the program enters decision block 294. If the predetermined amount of time required by decision block 294 has not elapsed, the program re-enters decision block 293 and continues "looping" until either a return pulse is received or until the predetermined time elapses, at which time the program knows that the second processor executed the program of FIGS. 6A–E. In this event, the program executes blocks 295–301, which can be identical to blocks 170–178 of FIG. 6B already explained.

If the program determines in decision block 293 that the second processor executes a program identical to that of system 325, the program then retrieves the next four bits (i.e., the next X-Y pair) corresponding to the next question from random access memory 24' and the on-board memory, as indicated in block 303. The program then tests the accumulator (block 307) to determine if its contents are equal to zero. If they are not, the program enters block 305, and causes system 325 to send a pulse to the second processor. Next, the program causes the processor to subtract one from the accumulator, as indicated in block 306. Next, the program enters decision block 307 and again determines whether the number in the accumulator of processor 12' is zero. If not, the program again enters block 305 and repeats the foregoing execution until the number stored in the accumulator is zero. At this point, the program enters decision block 308. The program then determines whether the previous four bits constitute the last four bits to be transmitted. The determination of whether or not the last bit has been transmitted in decision block 308 is made on the basis of the question number.

The program then enters decision block 309 to determine if the second processor is ready. If the other processor is ready, it sends a ready pulse. If a ready pulse has not been received by system 325 from the second processor, the program loops about decision block 309 until such ready pulse is received. The program then re-enters block 303 and continues execution of the above-described loop from block 303 to 309 until all sets of personal data numbers in system 325 have been transmitted by system 325 to the second processor.

At this point, note that block 258 of FIG. 16 results in a "return result status pulse" being sent. Since the second processor executes a program identical to that of FIGS. 13–17, the program in system 325 waits for this pulse, as indicated by decision block 310. When it arrives, this means that the second machine has finished performing the internal processing of results in accordance with block 257 of the program executed by the second processor. (This is a relatively time-consuming procedure). When that pulse has been received, the program enters block 311, and sends its own "ready" pulse. The program then enters block 312, wherein it receives results from the second processor and stores them.

The program then enters block 302 from either block 312 or block 301 and loads the initial results for display and returns to the display loop via label 207.

A print-out of a program substantially represented by FIGS. 13–17 is shown in Appendix A, attached hereto.

Although the invention has been described by referring to particular embodiments thereof, it will be recognized that various arrangements of parts and steps readily apparent to those skilled in the art are within the spirit and scope of the invention.

I claim:

1. A first portable computing device for comparing a first set of data stored in said first portable computing device with a second set of data stored in a second computing device to which said first portable computing device can be temporarily coupled, said first portable computing device comprising in combination:

(a) coupling means for temporarily coupling said first portable computing device to said second computing device to effect transmission of data of said first set from said first portable computing device to said second computing device and to effect transmission of data from said second set from said second computing device to said first portable computing device, said first set of data including a plurality of items of information about a first subject, said second set of data including a plurality of items of information which correspond with said plurality of items of said first set, wherein said items of said first set are to be respectively compared with said corresponding items of said second set;

(b) first storage means in said first portable computing device for storing said first set of data, said first storage means being capable of storing said first set of data with only a negligable amount of dissipation of power supplied to said first storage means;

(c) first transmitting means connected to said coupling means for transmitting data of said first set from said portable computing device to said second computing device via said coupling means;

(d) first receiving means responsive to said coupling means for receiving data of said second set from said second computing device;

(e) data entry means for effecting manual entry of said first set of data into said first storage means and also effecting manual entry of said second set of data into said first portable computing device;

(f) second storage means in said first portable computing device for receiving said data of said second set from said first receiving means or said data entry means and storing said data of said second set;

(g) first comparing means in said first portable computing device responsive to said first storage means and said second storage means for comparing said data of said first set with said data of said second set to produce a plurality of comparison data items corresponding, respectively, to said items of said first set;

(h) first computing means in said first portable computing device responsive to said first comparing means for operating on said plurality of comparison data items to compute a first number, said first number being indicative of the degree of similarity between said data of said first and second sets; and (i) first display means in said first portable computing device responsive to said first computing means for displaying said first number.

2. The first portable computing device of claim 1 wherein said first storage means includes a CMOS random access memory.

3. The first portable computing device of claim 2 wherein said first computing means includes a microprocessor.

4. The first portable computing device of claim 3 wherein said second storage means includes an on board random access memory incorporated in said microprocessor.

5. The first portable computing device of claim 3 wherein said first computing means executes a first program to effect said operating on said plurality of comparison data items and wherein said second computing device includes third storage means for storing said transmitted data from said first set and second comparing means responsive to said third storage means for comparing said data of said first set with said data of said second set to produce a plurality of comparison data items corresponding, respectively, to said items of said second set, and second computing means for operating on said comparison data items produced by said second comparing means to compute a number indicative of the degree of similarity between said data of said first and second sets, said second computing means executing a second program, wherein said second program may be substantially identical to or substantially different from said first program, wherein if said first and second programs are substantially identical, said first program recognizes that said first and second programs are substantially identical and effects a first order of transmitting data, receiving data, and operating upon data, and wherein if said first and second programs are substantially different, said first program recognizes that said first and second programs are substantially different and effects a second order of transmitting data, receiving data, and operating on data.

6. A method of utilizing first and second computing devices to compare first and second sets of data, said first computing device being portable, said method comprising the steps of:

(a) entering and storing said first set of data in said first computing device, said first set of data including a plurality of items of information, said second set of data including a plurality of items of information, said plurality of items of said first set corresponding, respectively, to said plurality of items of said second set;

(b) determining whether said second set of data is to be introduced into said first computing device by means of said second computing device containing said second set of data or by means of a keyboard of said first computing device;

(c) if it is determined that said second set of data is to be introduced into said first computing device by means of said second computing device, coupling said first computing device to said second computing device and transferring said second set of data from said second computing device to said first computing device;

(d) if it is determined that said second set of data is to be introduced into said first computing device by means of said keyboard, utilizing said keyboard of said first computing device to effect manual entry of said second set of data into said first computing device;

(e) comparing said items of information of said second set now in said first computing device with corresponding items of information of data of said first set to produce a plurality of comparison data item numbers corresponding to respective ones of said items of information of said first set;

(f) operating on said plurality of comparison data item numbers to compute a first number that is indicative of the degree of similarity between said data of said first set and said data of said second set; and (g) displaying information represented of said first number to provide an indication of the degree of similarity between said first and second sets of data.

* * * * *